United States Patent
Tomita et al.

(10) Patent No.: US 7,142,321 B2
(45) Date of Patent: Nov. 28, 2006

(54) IMAGE PROCESSING APPARATUS HAVING REWRITABLE FIRMWARE, JOB MANAGEMENT METHOD, AND MANAGEMENT APPARATUS

(75) Inventors: Atsushi Tomita, Toyohashi (JP); Hideki Hino, Toyokawa (JP); Hideo Mae, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 918 days.

(21) Appl. No.: 10/218,589

(22) Filed: Aug. 15, 2002

(65) Prior Publication Data

US 2003/0035139 A1 Feb. 20, 2003

(30) Foreign Application Priority Data

Aug. 20, 2001 (JP) ............... 2001-249600

(51) Int. Cl.
  *G06F 3/12* (2006.01)
  *G06K 1/00* (2006.01)
(52) U.S. Cl. .................. 358/1.15; 717/168; 717/174
(58) Field of Classification Search ............ 358/1.15, 358/1.14; 717/168, 174
  See application file for complete search history.

(56) References Cited

U.S. PATENT DOCUMENTS

| | | | |
|---|---|---|---|
| 5,970,224 A | 10/1999 | Salgado et al. | |
| 6,618,167 B1 * | 9/2003 | Shah | 358/1.15 |
| 6,990,659 B1 * | 1/2006 | Imai | 717/171 |

FOREIGN PATENT DOCUMENTS

| | | | |
|---|---|---|---|
| EP | 1 003 307 A2 | | 5/2000 |
| JP | 08179811 A | * | 7/1996 |
| JP | 9-065023 | | 3/1997 |
| JP | 11-007382 | | 1/1999 |
| JP | 2000-151885 | | 5/2000 |
| JP | 2000-326593 | | 11/2000 |
| JP | 2001-047697 | | 2/2001 |
| JP | 2001-203850 | | 7/2001 |
| JP | 2001-209508 | | 8/2001 |

OTHER PUBLICATIONS

Japanese Office Action (with English translation) dated Dec. 14, 2004.

* cited by examiner

*Primary Examiner*—Kimberly Williams
*Assistant Examiner*—Dillon Murphy
(74) *Attorney, Agent, or Firm*—Buchanan Ingersoll & Rooney PC

(57) ABSTRACT

A printer controller receives firmware attached to e-mail from a mail server, downloads the firmware to an internal hard disk drive, and registers the job at the bottom of a job registration table. On subsequently receiving a print job or a scan job, the printer controller registers the job in the job management table, judges whether a firmware rewriting job is registered in the job management table, and if so, moves the print job or the scan job to be before the firmware rewriting job in the job management table. In this way, firmware rewriting jobs are always executed after print jobs, meaning that processing of print jobs is not delayed.

5 Claims, 31 Drawing Sheets

| job number | job type | supplementary information | address |
|---|---|---|---|
| 1 | 1(print job) | | 0x1000 |
| 2 | 3(scan job) | | |
| 3 | 2(firmware rewriting job) | 1(control module 110) | 0x2000 |
| 4 | 1(print job) | | 0x3000 |
| ⋮ | | | |

| No. | model | e-mail address | other information | |
|---|---|---|---|---|
| 1 | model 1 | device1@customer1.com | ... | |
| 2 | model 2 | device2@customer1.com | ... | |
| 3 | model 3 | device3@customer1.com | ... | |
| ⋮ | ⋮ | ⋮ | ⋮ | |

IMAGE PROCESSING APPARATUS HAVING REWRITABLE FIRMWARE, JOB MANAGEMENT METHOD, AND MANAGEMENT APPARATUS

This application is based on application No. 2001-249600, filed in Japan, the contents of which are hereby incorporated by reference.

BACKGROUND OF THE INVENTION (1) Field of the Invention

The present invention relates to an image processing apparatus and a management apparatus that are connected to a client terminal, and in particular to a technique for determining a schedule for executing image processing jobs and firmware rewriting jobs in the image processing apparatus.

(2) Related Art

Conventionally, when there is a need to change programs or control parameters for controlling operations of an image forming apparatus such as a printer, the mask ROM on the control circuit board in the image forming apparatus is exchanged for a mask ROM in which new firmware is written. However, it is necessary to send a service person out to exchange the mask ROM. This is costly since exchanging the mask ROMs is complicated and takes considerable effort.

For this reason, systems have be conceived in which a rewritable flash ROM is used instead of mask ROM, firmware for rewriting is distributed via the Internet, and the image forming apparatus automatically executes firmware rewriting. Japanese laid open patent application 2000-162926 discloses one example of such a system. In this system firmware for a facsimile apparatus is attached to e-mail and transmitted to the apparatus. This enables a great reduction in the cost of firmware rewriting.

However, as apparatuses become highly functional and multi-functional, firmware for image processing apparatuses has swelled in size to be around 10 megabytes, and is tending towards further increase in the future. Due to cost demands, the structure of the internal control unit in an image processing apparatus is not optimized for completing the firmware rewriting quickly, since the firmware in an image processing apparatus is not rewritten often. Generally a low speed serial interface originally for the purpose of transmitting and receiving control data is used when writing firmware to storage devices such as the flash ROM. For this reason, processing for rewriting such large firmware takes several tens of minutes.

Furthermore, while the firmware of a control module that executes print control is being rewritten, print control cannot be executed, and therefore print jobs are not executed during this time. Of course, if a redundant structure is employed in the control unit of the image forming apparatus such as that disclosed in Japanese laid open patent application 11-7382, it is possible to rewrite the firmware without stopping print operations. However, this kind of redundant structure is generally not feasible because of restrictions in cost of the image forming apparatus.

Consequently, in a conventional image forming apparatus, print jobs and firmware rewriting jobs are managed so that the jobs are executed in the order in which they are received by the image forming apparatus.

However, in such a firmware rewriting system the service center distributes firmware attached to e-mail regardless of the reception state of print jobs in the image forming apparatus. Having jobs executed in order of reception as described above can cause, for example, the following types of inconveniences.

1. When a new print job is received after reception of a firmware rewriting job, the print job is not executed until the firmware rewriting has ended. Considering that the time required to rewrite the firmware as described above may be several tens of minutes, this causes inconvenience for the user who has to wait for several tens of minutes, and also hinders smooth paperwork.

2. On the other hand, there are cases in which it is desirable to execute firmware rewriting processing urgently in order to avoid breakdowns and malfunctions in the image forming apparatus. In such cases, there is a danger that waiting until after all print jobs that were received before the firmware rewriting job have ended to execute rewriting processing may result in print defects such as deterioration of printed image quality, or jams.

3. Furthermore, having the execution schedule of jobs determined at the discretion of the image processing apparatus can be contrary to the wishes of the user.

Such problems in a firmware rewriting system occur not only in image forming apparatuses such as printers and photocopiers, but also in scanners or in image data processing apparatuses (hereinafter apparatuses that are involved in some way with processing image data are referred to under a broader term "image processing apparatuses").

SUMMARY OF THE INVENTION

In view of the above-described problems, a first object of the present invention is to provide an image processing apparatus that coordinates image processing job execution requests from users and the necessity of firmware rewriting, and is capable of adequately performing job management for the image processing apparatus.

Furthermore, a second object of the present invention is to provide a job management method that is executed in an image processing apparatus such as the aforementioned.

In addition, a third object of the present invention is to provide a management apparatus that is connected to an image processing apparatus and that coordinates image processing job execution requests from users and the necessity of firmware rewriting, and is capable of adequately performing job management for the image processing apparatus.

The aforementioned first object is achieved by an image processing apparatus, including: a firmware storage unit that stores firmware; a first reception unit that receives an image processing job from a first sender; an image processing job execution unit that executes the image processing job with use of the firmware; a second reception unit that receives a firmware rewriting job from a second sender; a firmware rewriting unit that rewrites the firmware by executing the received firmware rewriting job; and a modifying unit that modifies an execution schedule of the received image processing job and the received firmware rewriting job.

Accordingly, it is possible to rationally modify an execution schedule of received image processing jobs and received firmware rewriting jobs, based on predetermined conditions, and the execution schedule can be determined with sufficient consideration for both a firmware rewriting demand and an image processing job demand.

Note that the "first sender" is, for example, a management apparatus that is used by either the manufacturer of the image processing apparatus or by a party entrusted by the manufacturer, and that is connected to the image processing apparatus via a network. Furthermore, the "second sender" is, for example, is a client terminal that is connected to the image processing apparatus, and that issues image processing jobs to the image processing apparatus. "Image processing job" refers to a job relating to image processing that is issued to the image processing apparatus from a client terminal that is connected thereto, and that is to be executed by the image processing apparatus. In the present invention, "image processing job" mainly refers to, but is not limited to, print jobs. Types of image processing jobs may include scan jobs, copy jobs, and image data processing jobs. Furthermore, "firmware rewriting job" is a job that is issued by the first sender to the image processing apparatus, and that is a job to be executed in the image processing apparatus for rewriting firmware.

Here, the modifying unit may modify the execution schedule so that the image processing job is executed with priority over the firmware rewriting job.

According to the stated structure, execution of image processing jobs is not delayed by firmware rewriting.

Here, the image processing apparatus may further include: a rewriting time obtaining unit that obtains a rewriting time required to execute the received firmware rewriting job, wherein the modifying unit, when the obtained rewriting time is shorter than a predetermined time, modifies the execution schedule so that the firmware rewriting job is executed with priority over the image processing job.

According to the stated structure, firmware rewriting can be given priority to a degree that does not inconvenience a user who has issued a print job.

Furthermore, here the image processing apparatus may further include: a first time obtaining unit that obtains a first time that is required to execute the received firmware rewriting job; a second time obtaining unit that obtains a second time that is required to execute an image processing job received before reception of the firmware rewriting job, wherein the modifying unit, when the first time is shorter than the second time, modifies the execution schedule so that the firmware rewriting job is executed with priority over the image processing job.

According to the stated construction, image processing jobs that have already been received and a firmware rewriting job can be evaluated and compared based on their processing times, and an appropriate execution schedule determined.

In addition, image processing apparatus may further include: a third time obtaining unit that obtains a third time that is required to execute an image processing job received after reception of the firmware rewriting job and before execution of rewriting of the firmware, wherein the modifying unit, when the third time is shorter than the first time, modifies the execution schedule so that the image processing job received after reception of the firmware rewriting job and before execution of rewriting of the firmware is executed with priority over the firmware rewriting job.

According to the stated construction, a priority order of image processing jobs received after a firmware rewriting job and the firmware rewriting job can be determined rationally.

Furthermore, the image processing apparatus may further include: an urgency judgment unit that judges whether the received firmware rewriting job is urgent, wherein, the modifying unit, when the firmware rewriting job is urgent, modifies the execution schedule so that the firmware rewriting job is executed with priority over the image processing job, and, when the firmware rewriting job is not urgent, modifies the execution schedule so that the image processing job is executed with priority over the firmware rewriting job.

By having an urgent firmware rewriting job executed with priority, problems in the image processing apparatus can be prevented before they occur, and image processing jobs can be executed in a optimum state. This is of benefit to the user.

Furthermore, image processing apparatus may further include: an inquiry unit that, when the second reception unit receives the firmware rewriting job, makes an inquiry to the first sender about an order of priority of the image processing job and the firmware rewriting job; and a response reception unit that receives a response to the inquiry, from the first sender, wherein the modification unit modifies the execution schedule, according to the received response.

By determining the priority order based on the response from the sender of the image processing job, the execution schedule can be modified sufficiently reflecting the wishes of the user who transmitted the image processing jobs.

In addition, the image processing apparatus may further include: an urgency degree judgement unit that judges a degree of urgency of the firmware rewriting job; an inquiry unit that, when the degree of urgency is lower than a predetermined degree, makes an inquiry to the first sender about an order of priority of the image processing job and the firmware rewriting job; and a response reception unit that receives a response to the inquiry, from the first sender, wherein the modifying unit, when the degree of urgency is equal to or higher than the predetermined degree, modifies the execution schedule so that the firmware rewriting job is executed with priority over the image processing job, and, when the degree of urgency is lower than the predetermined degree, modifies the execution schedule according to the response.

In this way a firmware rewriting job that has at least a predetermined degree of urgency is executed with priority over image processing jobs. For a firmware rewriting job that has a lower degree of urgency, an inquiry is made to the sender of the image processing job about the priority of execution. Therefore, the execution schedule can be modified with sufficient consideration of the necessity of firmware rewriting and the will of the user who transmitted the image processing job.

Furthermore, the image processing apparatus may further include: a timer unit that, when the degree of urgency is judged to be lower than the predetermined degree, starts a timer, wherein the modifying unit, when a predetermined length of time has been timed by the timer unit, and even if a response is not received instructing that the firmware rewriting job is to be executed with priority over the image processing job, modifies the execution schedule so that the firmware rewriting job is executed with priority over the image processing job.

According to the stated construction, when there is not a response from the user to execute the firmware rewriting job with priority, in other words when there is a response to execute the image processing job with priority over the firmware rewriting, or when there is no response, the firmware rewriting can be executed after a predetermined time has passed.

The second objective is achieved by a job management method executed in an image processing apparatus, including the steps of: receiving an image processing job from a first sender; receiving a firmware rewriting job from a second sender; registering the received image processing job and the received firmware rewriting job in a job management table; modifying an order in which the jobs are registered in the job management table; and executing the image processing job and the firmware rewriting job in the order in which the jobs are registered in the job management table.

In this way image processing jobs and firmware rewriting jobs are registered in the same job management table, and the jobs are managed by modifying the order in the table so that jobs are executed in the order, image processing jobs and firmware rewriting jobs can be managed collectively.

The third object is achieved by a management apparatus that is connected to an image processing apparatus, and that manages execution of jobs by the image processing apparatus, including: a first reception unit that receives an image processing job from a first sender; a second reception unit that receives a firmware rewriting job from a second sender; and a modifying unit that modifies an execution schedule of the received image processing job and the received firmware rewriting job.

By including a modifying unit, the management apparatus is able to modify the execution schedule of image processing jobs and firmware rewriting jobs rationally. Furthermore, the management unit is able to manage jobs for the image processing apparatus with sufficient consideration to firmware rewriting demands and image processing job execution demands.

Note that here "management apparatus" denotes a unit that is connected to the image processing apparatus, and that is for managing jobs for the image processing apparatus. Specifically, the management apparatus is, for example, an internal printer controller board in the image processing apparatus, or a management apparatus that is external to and connected to the image processing apparatus and that includes an internal printer controller board.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows an example of a registration information management table stored in a hard disk drive in the personal computer 90;

DESCRIPTION OF PREFERRED
EMBODIMENTS

The following describes embodiments of an image processing apparatus of the present invention, with reference to the drawings.

First Embodiment

<1-1 Overall Structure>

Figure 1:
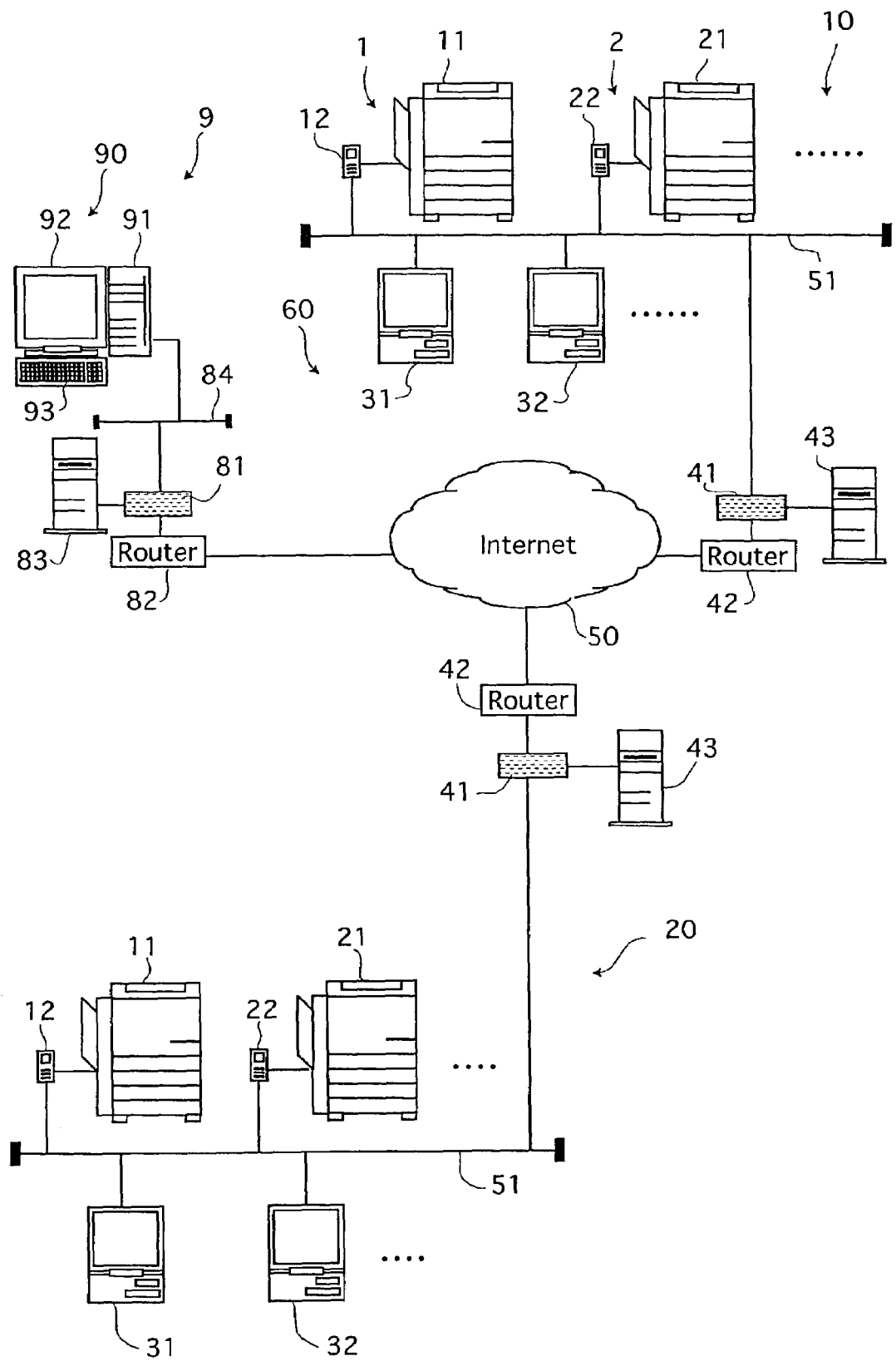
FIG. 1 shows the overall structure of an image processing system in a first embodiment of the present invention.

FIG. 1 shows the structure of an image processing system (hereinafter simply referred to as "system") that includes the image processing apparatus of the present embodiment.

As the figure shows, the system is composed of a PC (personal computer) 90 that is in a service center 9 and that manages firmware, an apparatus group 10 that is in a user's office or the like and that includes image processing apparatuses 1, 2, etc. and client terminals 31, 32, etc. The PC 90 and the apparatus group 10 are connected here by the Internet 50. In addition, an apparatus group 20 owned by another user is also connected to the Internet 50. Transmission and reception of various types of data such as image data is possible between the apparatuses via the Internet.

In the present embodiment firmware denotes programs that are for controlling hardware devices, and that are basic software executed by the modules (described later) in the image processing apparatus, and control data. The basic software includes activation programs, input/output programs, and control programs for image processing, driving members and the like. The firmware is distributed attached to electronic mail (hereinafter "e-mail") to image processing apparatuses by the PC 90.

The client terminals 31, 32, etc. and the image processing apparatuses 1, 2, etc. are connected via a LAN (Local Area Network) 51.

The client terminal 31 is a PC, and is capable of requesting the image processing apparatuses 1, 2 etc. to perform print processing (hereinafter "print job") to print on paper a document or an image that has been created using application software for creating documents, images or the like that is installed in the client terminal 31, and also requesting the image processing apparatuses 1, 2 etc. to perform a job of reading a document that is set in the image reader unit of the image processing apparatus (hereinafter "scan job"). Note that this structure is the same as that of the other client terminals 32 etc.

The image processing apparatus 1 includes an image forming apparatus 11 and a printer controller 12 that are connected to each other. The image forming apparatus 11 executes print jobs and scan jobs. The printer controller 12 controls communication with external apparatuses, and manages jobs to be executed by the image forming apparatus 11.

The printer controller 12 receives requests for print jobs from the client terminals 31, 32, etc. via the LAN 51, transfers the print jobs to the image forming apparatus 11, and has the image forming apparatus 11 execute the print jobs. In addition, the printer controller 12 downloads e-mail from a mail server 43 at predetermined intervals, and obtains firmware from e-mail to which the firmware is attached. Note that this structure is the same as that of the other image processing apparatuses 2 etc.

A router 42 is provided at a connection portion where the LAN 51 and the Internet 50 are connected. As well as mutually connecting the LAN 51 and the Internet 50, the router 42 performs path control. Furthermore, a firewall 41 is provided between the router 42 and the image processing apparatuses 1, 2, etc.

The functions of the firewall 41 include filtering packets and acting as a proxy server. The firewall 41 permits passage only of packets whose sender IP address (host name), destination IP address (host name), sender port number, destination port number, data, and so on fulfill predetermined conditions. Here, communication according to SMTP (Simple-mail Transfer Protocol) is permitted to pass.

Furthermore, the mail server 43 is connected to the LAN 51, and collects and distributes e-mail.

The service center 9, in addition to the PC 90, includes a firewall 81, a router 82, and a mail server 83 which are connected to the LAN 84. The firewall 81, the router 82, and the mail server 83 have the same functions as the firewall 41, the router 42, and the mail server 43 respectively.

Note that the apparatuses in the apparatus group 20 have basically the same functions as the apparatuses in the apparatus group 10, and so are given the same reference numbers. Accordingly, a description of the apparatuses in the apparatus group 20 is omitted.

The following describes the various apparatuses. Descriptions are given of the image processing apparatus 1 and the client terminal 31. Description of the other image processing apparatuses and the other client terminals are omitted since they have the same structures as the image processing apparatus 1 and the client terminal 31 respectively.

<1-2 Structure of the Client Terminal 31>

Figure 2:
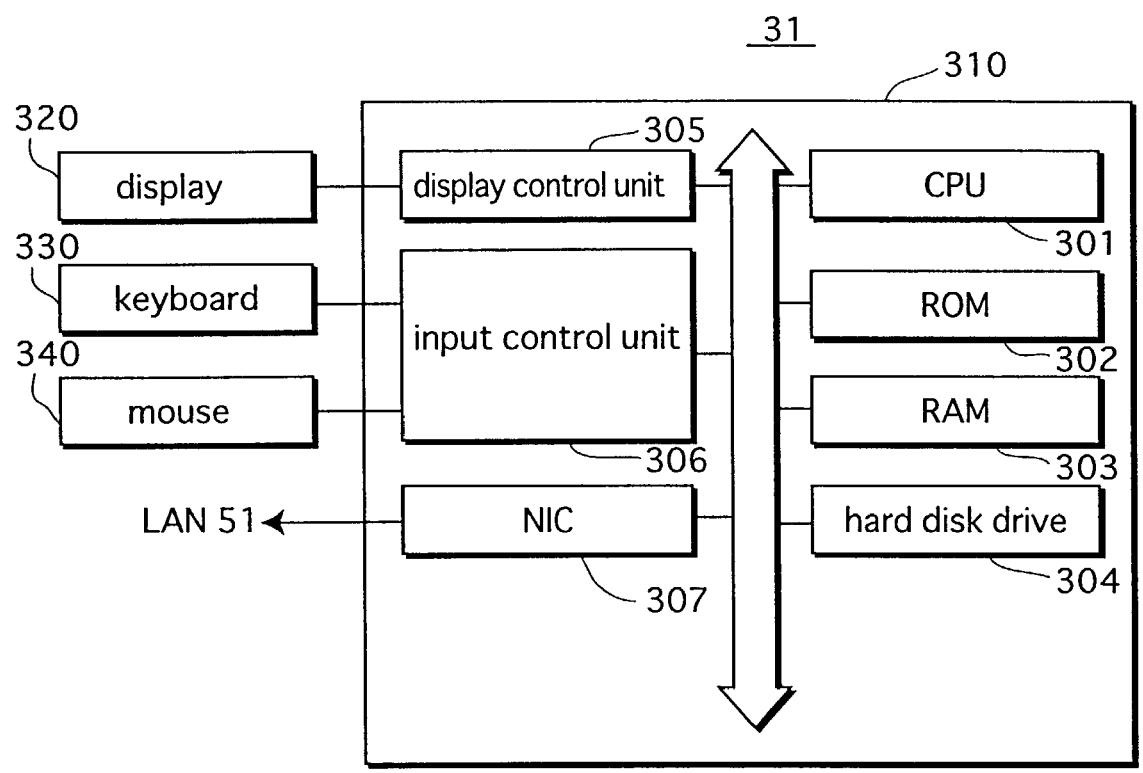
FIG. 2 is a block drawing showing the circuit structure of a client terminal 31.

FIG. 2 is a block drawing showing the structure of the client terminal 31.

As the figure shows, the client terminal 31 is composed of a computer unit 310, a display 320, a keyboard 330 and a mouse 340.

The computer unit 310 is composed of a CPU (Central Processing Unit) 301, a ROM (Read Only Memory) 302, a RAM (Random Access Memory) 303 that provides a work area, a hard disk drive 304, a display control unit 305, an input control unit 306 and an NIC (Network Interface Card) 307. The display control unit 305 controls display on the display 320. The input control unit 306 receives inputs of signals from the keyboard 330 and the mouse 340. The NIC 307 is for transmitting and receiving various types of data to and from the image processing apparatus 1 etc. via the LAN 51.

The ROM 302 stores application programs for document editing and image editing, print drivers, and so on. The CPU 301 executes these programs and so on.

The print driver creates print job data by adding control information to the document or image data to be printed (print data) as a header. This control information is necessary for printing and includes job control information and page control information.

Here, the job control information includes a job sender name, a user ID, and the number of copies to be made. The page control information includes the size of the paper to be printed on, print color information showing whether to print in color or monochrome, and paper feeder information showing which feeder paper is to be supplied from. The print data that is created by the application programs, and is converted to data which the print controllers 12, 22, etc. are able understand (Page Description Language).

On receiving input of a print instruction from the an operation of the keyboard 330 or the like from the user, the CPU 301 transmits the print job data to be executed to the image processing apparatus designated as the destination to have the print job executed. Hereinafter, this processing is referred to as "print job transmission", and processing for receiving sent print job data is referred to as "print job reception".

The hard disk drive 304 is a non-volatile memory in which document data and various types of information such as the mail addresses of the image processing apparatuses 1, 2, etc. are stored.

<1-3 Structure of the Image Processing Apparatus 1>

The image processing apparatus 1 is commonly called an MFP (Multi Function Peripheral), and has a plurality of function such as a print function for executing print jobs requested by the client terminals 31, 32, etc., and a remote scan function for executing scan jobs requested by the client terminals 31, 32 etc.

The following describes the structure of the image forming apparatus 11 and the printer controller 12 included in the image processing apparatus 1.

<1-3-1 Structure of the Image Forming Apparatus 11>

Figure 3:
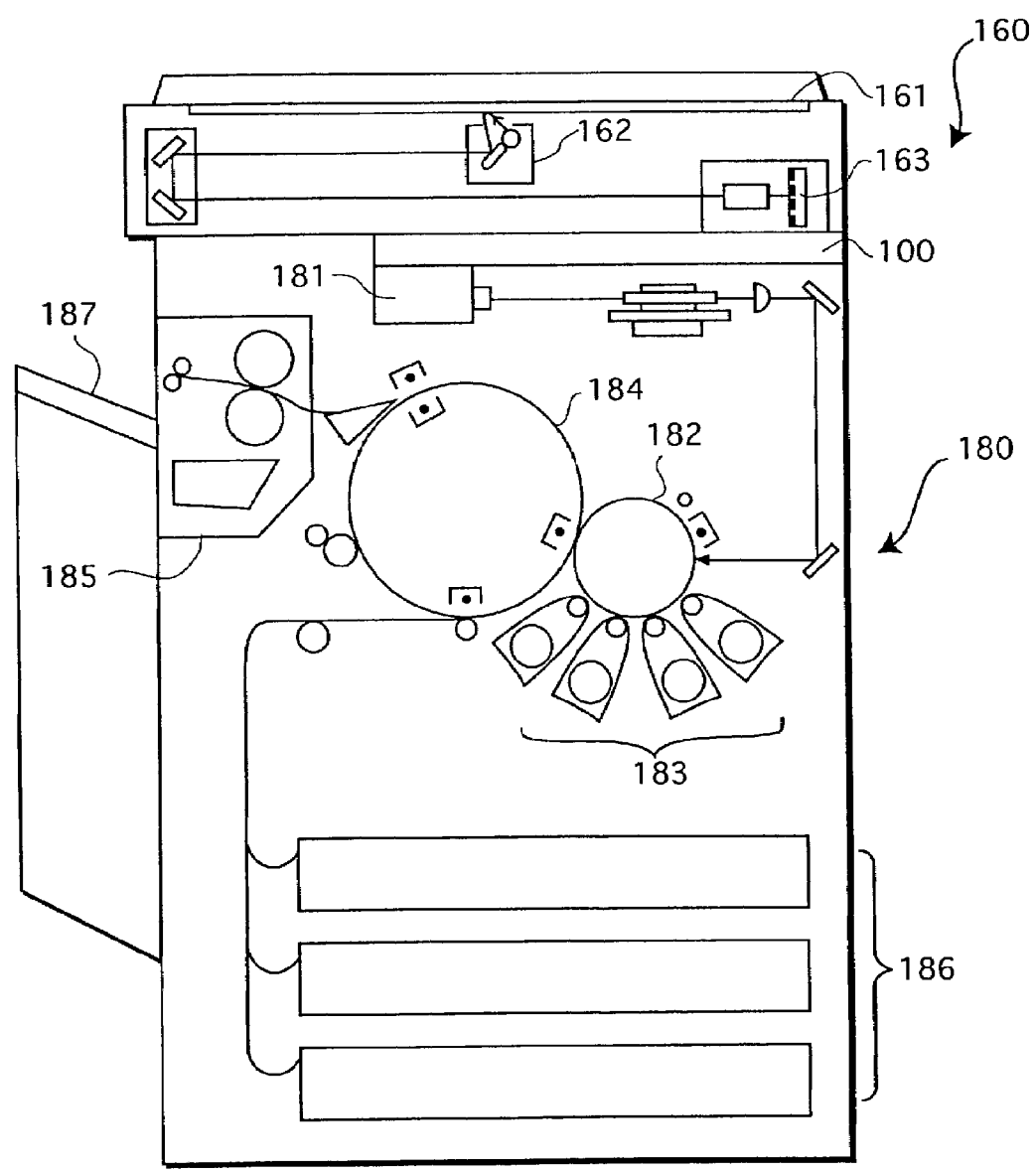
FIG. 3 shows the structure of an image forming apparatus 11.

FIG. 3 is a schematic drawing of the structure of the image forming apparatus 11.

The image forming apparatus 11 forms images according to a commonly-known electrophotgraphic method. The image forming apparatus 11 can be roughly divided into an image reader (IR) unit 160 and a printer unit 180. The image reader unit 160 reads document images. The printer unit 180 prints on paper image data read by the IR unit 160.

The IR unit 160 includes a scanner 162 that scans a document set on platen glass 161 by irradiating the document, and a CCD sensor 163 that photoelectrically converts light reflected from the document. The resulting signal is sent to a control unit 100 as image data.

The printer unit 180 includes a print head 181, a photosensitive drum 182, a developing unit 183, a transfer drum 184, a fixing unit 185 and a sheet feeder unit 186.

The print head 181 emits a laser according to a driving signal from the control unit 100, and exposes the photosensitive drum 182. This results in a latent image being formed on the photosensitive drum 182. The latent image is successively developed by cyan (C), magenta (M), yellow (Y) and black (K) developers that are provided in the developing unit 183, to form a toner images. Meanwhile, paper is fed from the sheet feeder unit 186 to the transfer drum 184, and wound around the transfer drum 184. The toner images formed on the photosensitive drum 182 in each color are successively transferred onto the paper wound around the transfer drum 184 so as to be overlaid on each other. After the transfer is complete, the paper is removed from the transfer drum 184 and sent to the fixing unit 185. The toner image on the paper is fixed to the paper by a heater (not illustrated) in the fixing unit 185. After passing through the fixing unit 185, the paper is discharged to an external tray 187. The operations of the IR unit 160 and the printer unit 180 are controlled by the control unit 100.

<1-3-2 Structure of the Control Unit 100>

Figure 4:
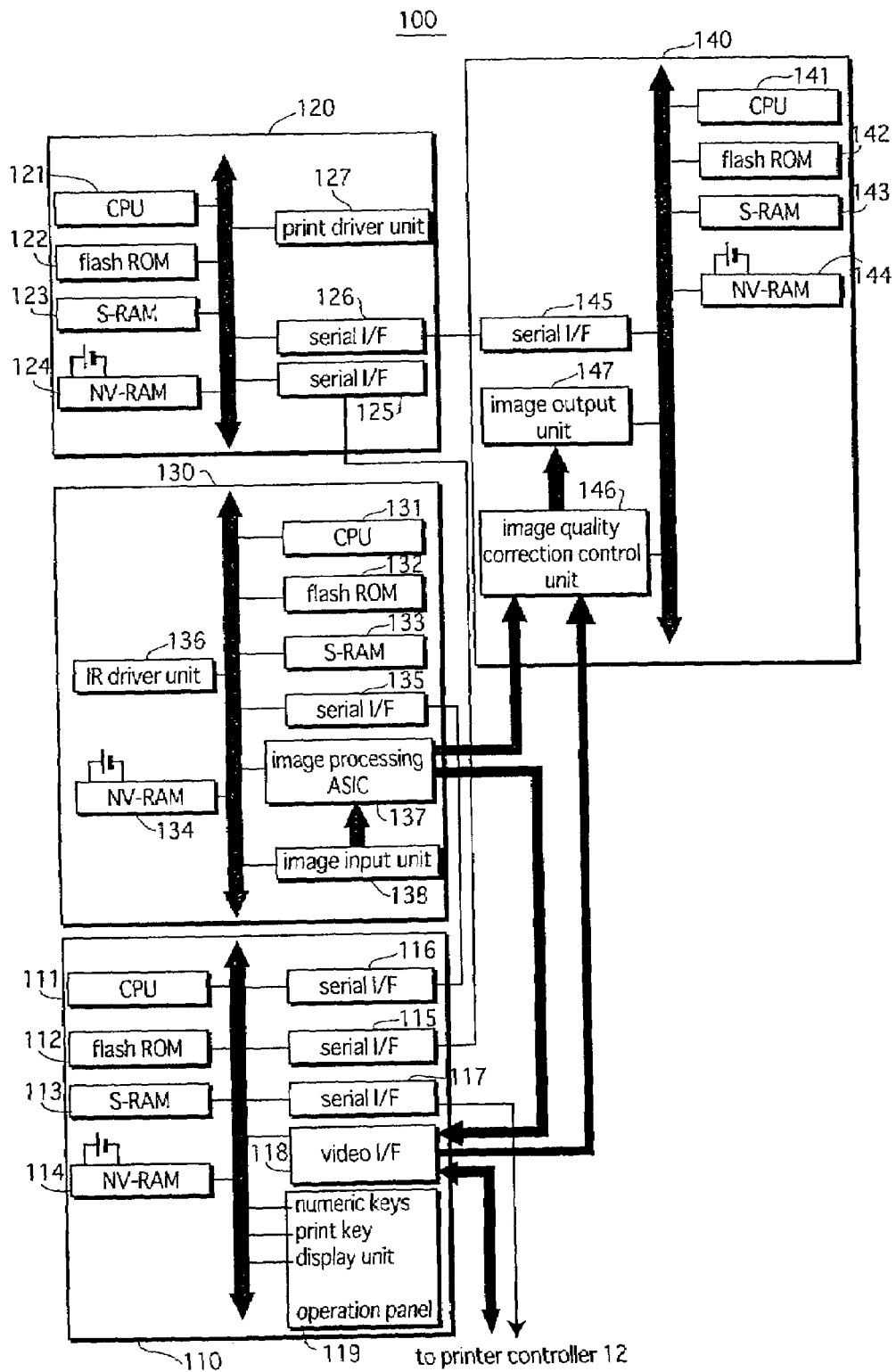
FIG. 4 is a block drawing showing the structure of a control unit 100 in the image forming apparatus 11.

FIG. 4 is a block drawing of the structure of the control unit 100 in the image forming apparatus 11.

As the figure shows, the control unit 100 is controlled by a multi-CPU system, and is composed of four control modules 110, 120, 130 and 140 that each correspond to one of the CPUs. Here, module denotes a function block that includes a CPU or that includes a control circuit including a CPU, and that executes control functions.

The control module 110 is composed of a CPU 111, a flash ROM 112, an S-RAM (Static Random Access Memory) 113 that provides a work area, an NV-RAM (Non-Volatile Random Access Memory) 114, serial I/Fs (interfaces) 115, 116 and 117, a video I/F 118, and an operation panel 119.

The CPU 111 transmits and receives control commands and the like between the control modules 120 to 140, and performs overall control of the image forming apparatus 11.

The flash ROM 112 is a non-volatile memory whose contents can be electrically rewritten, and stores firmware for the operations of the CPU 111.

The NVRAM 114 is a memory for saving various setting values, and has a battery back up.

The serial I/F 115 and the serial I/F 116 are interfaces for transmitting and receiving control commands and the like to and from the control module 120 and the control module 130 respectively.

The serial I/F 117 is an interface for transmitting and receiving control commands and the like to and from the printer controller 12.

The operation panel 119 is composed of keys for receiving selection inputs regarding the copy mode and so on, numeric keys, a print key, and a display unit for displaying the content of input and so on. The operation panel 119 is provided in a position where it can be operated easily by the user.

The video I/F 118, on receiving image data for executing a print job from the printer controller 12, outputs the image data to the control module 140.

Note that when executing a scan job, on image data of a read document being received by the video I/F 118 from the control module 130, the CPU 111 performs processing to transmit the image data via the video I/F 118 to the printer controller 12, in order to have image data transmitted to the client terminal that made the request.

The CPU 111 issues a busy signal to the printer controller 12 when a job such as a print job or a firmware rewriting job is being executed, and a ready signal to the print controller 12 when a job may be executed.

The control module 120 is composed of a CPU 121, a flash ROM 122, an S-RAM 123 that provides a work area, an NV-RAM 124 that saves various setting values, serial I/Fs 125 and 126, and a print driver unit 127.

The serial I/F 125 and the serial I/F 126 are interfaces for transmitting and receiving control commands and the like to and from the control module 110 and the control module 140 respectively.

The print driver unit 127 is a drive control circuit for turning the photosensitive drum 186, feeding paper from the sheet feeder unit 186, supplying power to the fixing unit 185, and so on.

The CPU 121 instructs image forming operations of the photosensitive drum 182 and so on to the print driver unit 127, and performs overall control of printing processing.

The flash ROM 122 a non-volatile memory the same as the flash ROM 112, and stores firmware for the operations of the CPU 121.

The control module 130 is composed of a CPU 131, a flash ROM 132, an S-RAM 133 that provides a work area, an NV-RAM 134 that stores various setting values, a serial I/F 135, an IR driver unit 136, an image processing ASIC 137, and an image input unit 138.

The serial I/F 135 is an interface for transmitting and receiving control commands and the like to and from the control module 110.

The IR driver unit 136 is a drive control circuit that supplies power and so on to a lamp for irradiating documents and to the motor for having the scanner 162 in the IR unit 160 scan.

The image input unit 138 drives the CCD sensor 163 in the IR unit 160 and outputs image data of a document that has been photoelectrically converted to the image processing ASIC 137.

The image processing ASIC 137 performs various types of commonly-known image processing such as shading correction, MTF correction, density correction, error diffusion and binarization on image data from the image input unit 138, and outputs the resulting image data to the control module 140 in the case of a print job, and to the control module 110 in the case of a scan job.

The CPU 131 instructs scan operations and the like of the scanner 162 to the IR driving unit 136, and performs overall control of processing for reading document images.

The flash ROM 132 is a non-volatile memory the same as the flash ROM 121, and stores firmware for the operations of the CPU 131.

The control module 140 is composed of a CPU 141, a flash ROM 142, an S-RAM 143 that provides a work area, an NV-RAM 144 that saves various setting values, a serial I/F 145, an image quality correction control unit 146, and an image output unit 147.

The image quality correction control unit 146 performs image quality correction processing such as smoothing and intermediate gradation reproduction on image data from the control modules 110 and 130, and outputs the resulting image data to the image output unit 147.

The image output unit 147 drives members such as the printer head 181 based on the image data from the image correction control unit 146, and performs exposure scanning of the photosensitive drum 182.

The CPU 141 instructs image quality correction processing and the like to the image quality correction control unit 146 and so on, and performs overall control of image correction and output processing of corrected image data.

The flash ROM 142 is a non-volatile memory the same as the flash ROM 121, and stores firmware for the operations of the CPU 141.

The serial I/F 145 is an interface for transmitting and receiving control commands and the like to and from the control module 120.

<1-3-3 Structure of the Printer Controller 12>

Figure 5:
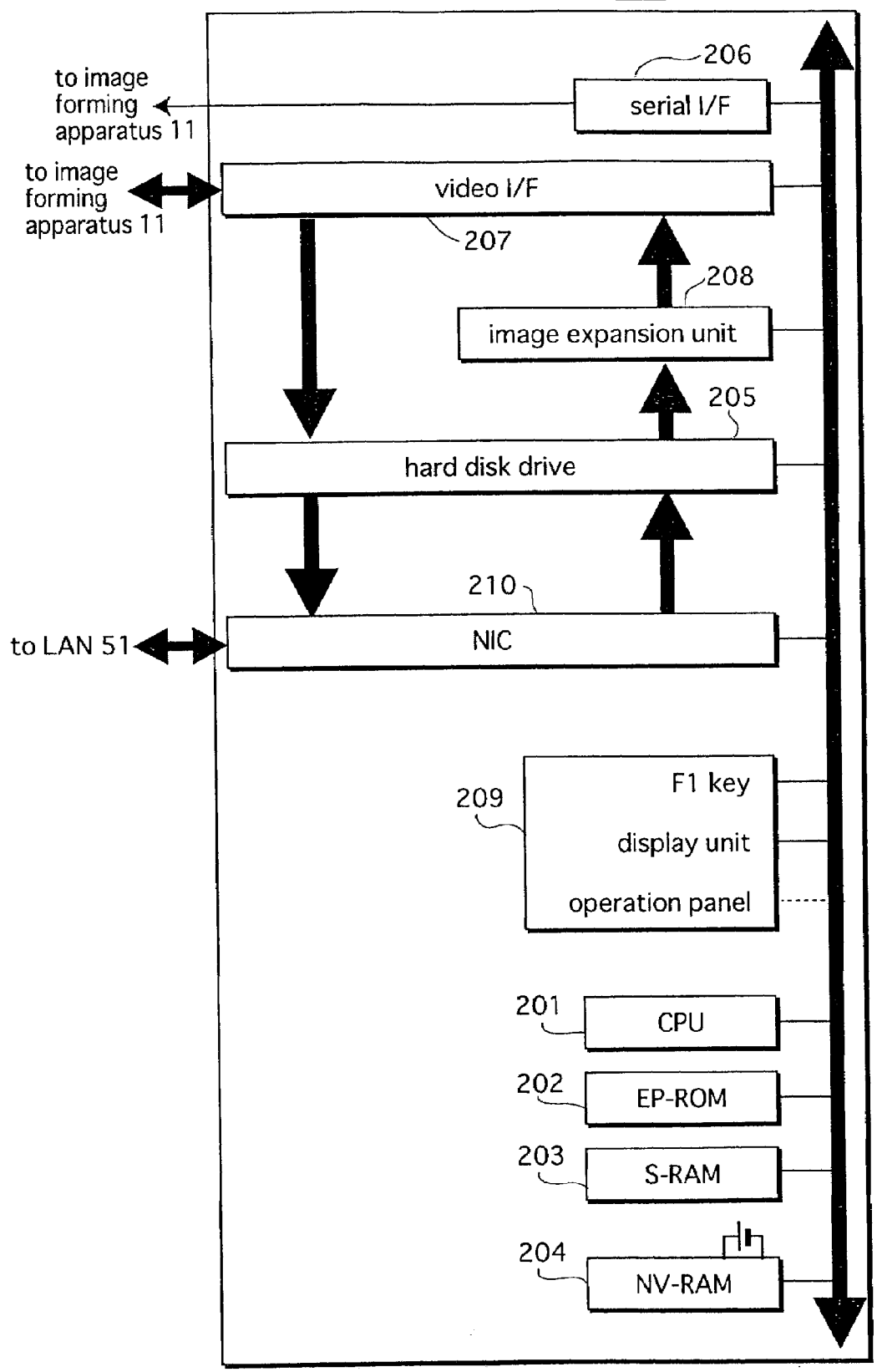
FIG. 5 is a block drawing showing the structure of a printer controller 12.

FIG. 5 is a block drawing showing the circuit structure of the printer controller 12.

As the figure shows, the printer controller 12 is composed of a CPU 201, an EP-ROM (Erasable Programmable Read Only Memory) 202, an S-RAM 203 that provides a work area, and NV-RAM 204, a hard disk drive 205, a serial I/F 206, a video I/F 207, an image expansion unit 208, an operation panel 209 and an NIC 210.

The CPU 201 receives print jobs and scan jobs from the client terminal 31 etc., manages the execution order of jobs in the image forming apparatus 11, controls transmission and reception of e-mail, instructs firmware rewriting to the image forming apparatus 11, and so on.

The EP-ROM 202 is a non-volatile memory, and stores control programs for the operations of the CPU 201.

The NIC 210 receives print jobs from the client terminal 31 etc. via the LAN 51.

The hard disk drive 205 is a non-volatile memory that temporarily stores print jobs received by the NIC 210, firmware extracted from e-mail, and image data received from the image forming apparatus 11 according to execution of a scan job, and so on. Firmware is sent to the imaging forming apparatus 11 via the serial I/F 206, without passing through the image expansion unit 208. Image data for scan jobs is transmitted via the NIC 210 to the client terminal that requested the scan job.

The image expansion unit 208 expands print data written in page description language that is included in a received print job to bit map data (image data), and transmits the image data to the image forming apparatus 11 via the video I/F 207.

The serial I/F 206 is connected to the serial I/F 117 in the image forming apparatus 11, and is an interface for transmission and reception of control commands and transmission of firmware to and from the control module 110.

The video I/F 207 is connected to the video I/F 118 in the image forming apparatus 11, and is an interface for transmitting and receiving image data and the like to and from the control module 110.

The operation panel 209 includes an F1 key (described later) for performing communication settings, and a display unit for displaying content that has been set.

The NV-RAM 204 stores various setting values, a job management table 211, and soon. In addition to the mail address of the image processing apparatus 1, the NV-RAM 204 also stores the address of the mail server 43, which is necessary for downloading e-mail for the printer controller 12 from the server 43, and the mail addresses of other image processing apparatuses 2 etc.

In this structure, the control modules 110 to 140 usually transmit and receive control commands and the like between the respective CPUs via the serial I/Fs. However, when there is a firmware rewriting job execution command from the printer controller 12, the firmware data is transmitted via the I/Fs. The reason that firmware, which is large in size, is transferred using serial I/Fs that are capable of transferring only a small amount of data each unit of time is that providing transmission lines that are used specifically for firmware rewriting is provided on the control board is extremely costly. Therefore, in reality such lines cannot be provided. Consequently, much time is required to transfer the large amount of data of the firmware.

Note that the flash ROM 112 that stores firmware is provided in a position close to the CPU 111. This is so that programs can be loaded to the CPU 111 quickly when the power is turned, and also to reduce noise during loading. This is the same for the respective CPUs and flash ROMs of the other control modules 120 to 140.

On the other hand, the communication lines used for image data when the image processing apparatus 1 executes a print job from the client terminal 31 etc. are a high-speed data bus. Specifically, the NIC 210, the image expansion unit 208, the video I/F 207, the video I/F 118 in the control module 110, the image quality correction unit 146, and the image output unit 147 in the control module 140, are connected by a high-speed data bus for fast transfer of image data. This is the same for the communication lines between the image input unit 138 and the image processing ASIC 137 in the control module 130, and the image quality correction control unit 146.

<1-4 Structure of the Apparatus at the Service Center 9>

Figure 6:
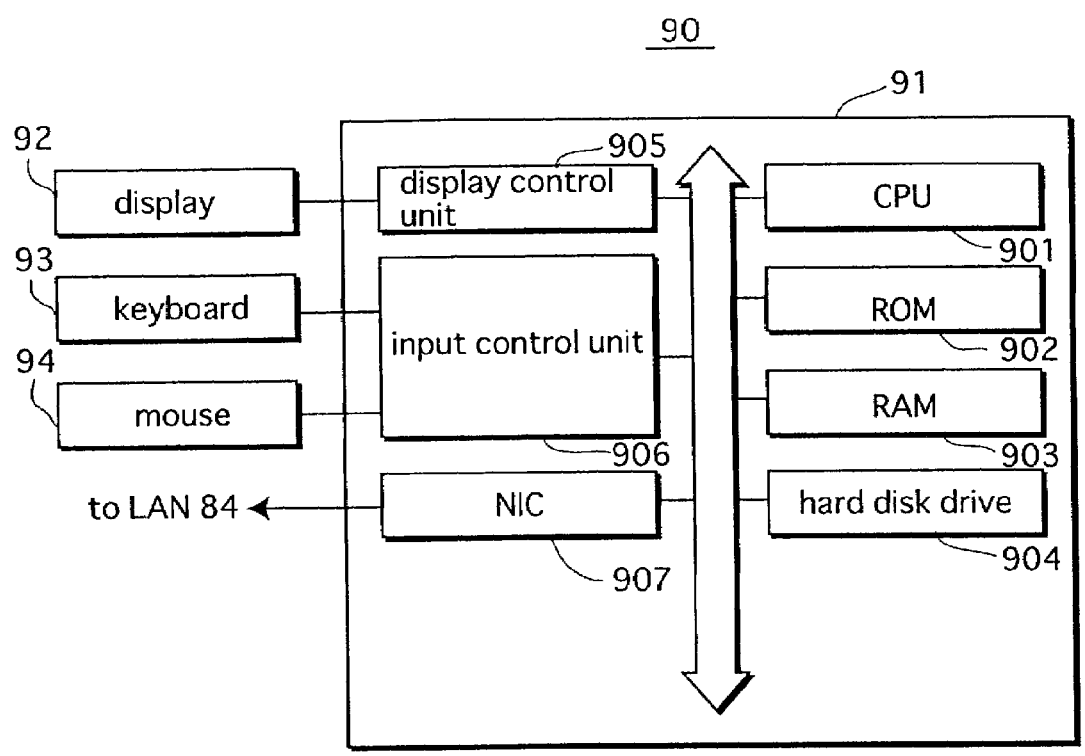
FIG. 6 is a block drawing showing the structure of a personal computer 90 provided at a service center 9.

FIG. 6 is a block drawing showing the circuit structure of the PC 90 that is provided at the service center 9.

As the figure shows, the PC 90 is composed of a computer unit 91, a display 92, a keyboard 93 and a mouse 94.

The computer unit 91 is composed of a CPU 901, a ROM 902, a RAM 903 that provides a work area, a hard disk drive 904, a display control unit 905 that controls display on a display 92, an input control unit 906 that receives input of signals from the keyboard 93 and the mouse 94, and an NIC 907 for transmitting firmware to the image processing apparatuses 1 etc. via the LAN 84.

The hard disk drive 904 is a non-volatile memory, and stores various information including the model name and e-mail address of each image processing apparatus 1, 2, etc., and firmware for each image processing apparatus. The firmware for each for each module in each model is stored in a separate folder (directory).

The CPU 901 manages firmware, controls transmission and reception of firmware, and executes processing for appending firmware to e-mail and transmitting the e-mail to the image processing apparatuses 1, 2 etc.

The ROM 902 stores a control program for the CPU 901 to perform processing for transmitting firmware.

The keyboard 93 has F1 to F3 keys for performing setting and registration of communication settings and the like which are described later.

<1-5 Content of Processing by the PC 90 at the Service Center 9>

Figure 7:
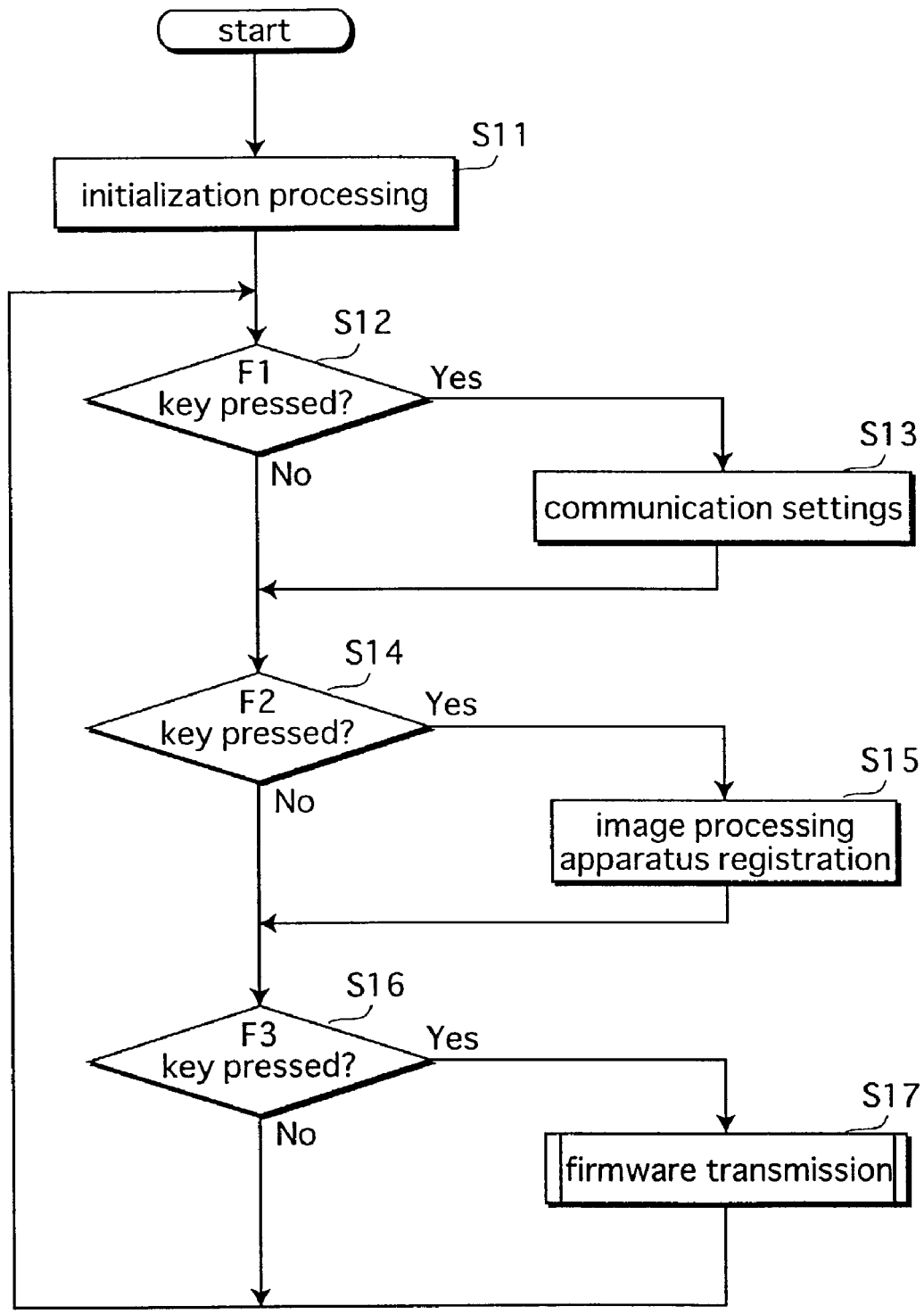
FIG. 7 is a flowchart showing the main routine of processing executed in the personal computer 90.

FIG. 7 is a flowchart showing the content of processing executed by the CPU 901 of the PC 90.

As the flowchart shows, when the power of the PC 90 is turned on the CPU 901 performs initialization processing of the RAM 903 and the other internal memories and of various parameters (step S11).

Next, the CPU 901 performs the following processing in response to operations of the F1 to F3 keys.

Specifically, on judging that the F1 key has been pressed (step S12, Yes), the CPU 901 performs communication settings (step S13).

Communication settings are for setting parameters for transmitting e-mail. Specifically, when the F1 key is pressed, the CPU 901 has an input screen for communication settings displayed on the display 92. When an administrator inputs the mail addresses of the PC 90 and the mail server 83, the CPU 901 stores the input information in the hard disk drive 904. When the communication settings are complete, the CPU 901 proceeds to step S14.

On judging that the F2 key has been pressed (step S14, Yes), the CPU 901 performs processing to register an image processing apparatus (step S15).

Specifically, when the F2 key is pressed, the CPU 901 has an input screen for registration of image processing apparatus displayed, has the administrator input information such as the model name and e-mail address of the image processing apparatus to which firmware is to be transmitted, and the name, address and telephone number of the user of the image processing apparatus, and stores the input information in a registration information table 96 in the hard disk drive 904.

FIG. 8 shows one example of the content of the registration information table 96.

As the figure shows, information columns for model name, mail address of the apparatus and so on are provided in the registration information table 96, and the input information is stored in correspondence therein. When transmitting firmware, the CPU 901 refers to the registration information table 96 to obtain the mail address of the image processing apparatus to which the firmware is to be transmitted.

Returning to FIG. 7, when the registration processing at step S15 is complete, the CPU 901 proceeds to step S16.

On judging that the F3 key has been pressed (step S16, Yes), the CPU 901 performs firmware transmission processing (step S17), and then returns to step S12.

Figure 9:
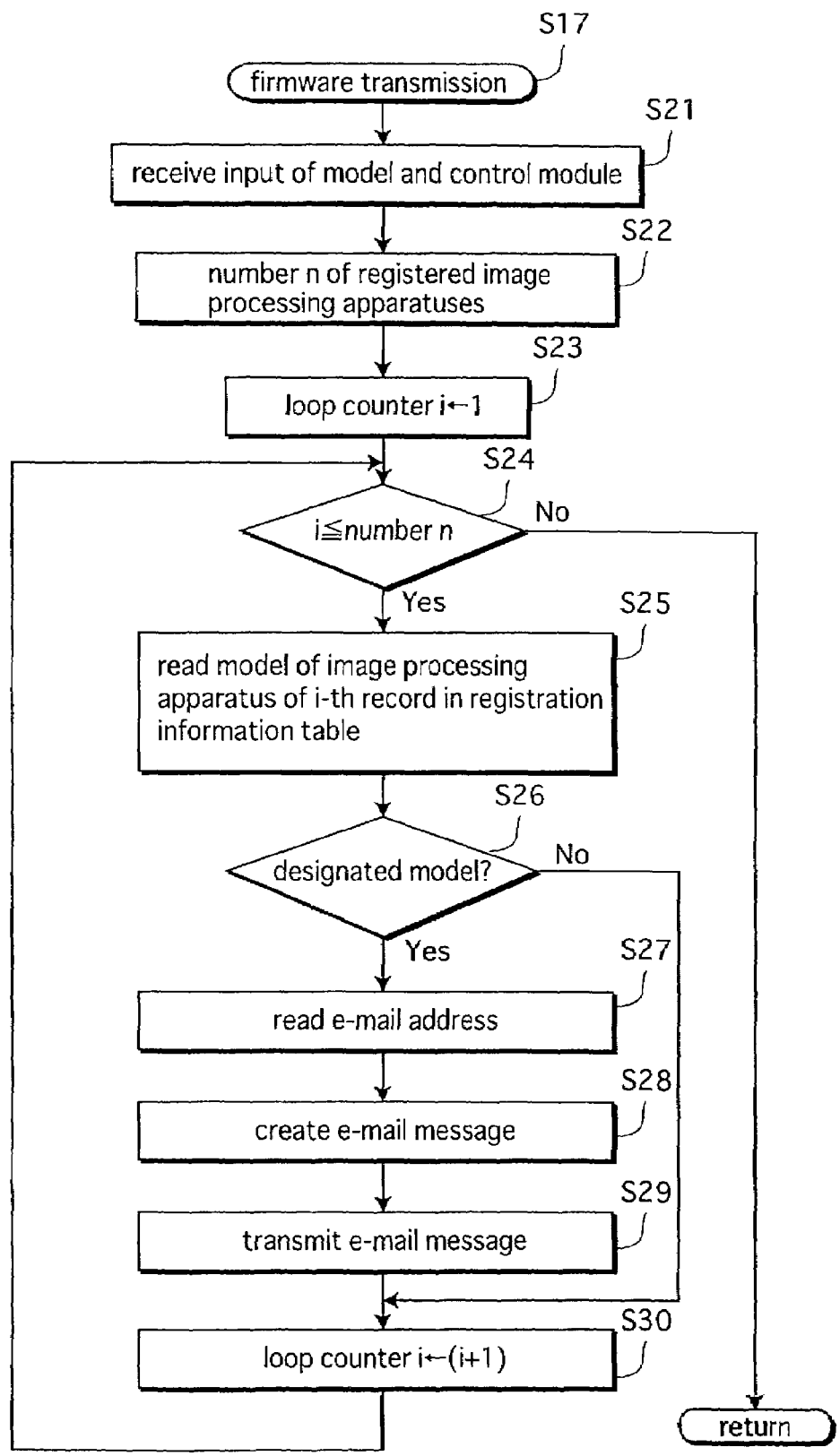
FIG. 9 is a flowchart showing the contents of firmware transmission processing at step S17 in FIG. 7.

FIG. 9 is a flowchart showing the contents of a firmware transmission processing sub-routine.

As the figure shows, the CPU 901 has an input screen for inputting the model name to which the firmware is to be transmitted and the number of the control module whose firmware is to be rewritten displayed on the display 92, and receives an input of the model name and module number from the administrator (step S21).

Next, the CPU 901 calculates a total number n of image processing apparatuses that are registered in the registration information table 96 (step S22), and sets a loop counter i to 1 (step S23).

Next, at step S24 the CPU 901 compares the value of i with the number n. Here, since i is considered to equal 1, the CPU 901 judges that i is equal to or less than n (step S24, Yes), and reads the model name in the i-th, here the first, registered record in the registration information table 96 (step S25). When the read model name is the same as the model name input at step S21 (step S26, Yes), the CPU 901 reads the mail address of that image processing apparatus from the registration information table 96 (step S27). Next, the CPU 901 specifies the firmware to be transmitted, based on the model name and module number input at step S21, designates the directory in the hard disk drive 904 in which the specified firmware is stored, reads the firmware from the directory, and creates e-mail to which it attaches the firmware as an attached file. The destination of the mail is the read e-mail address (step S28).

Figure 10:
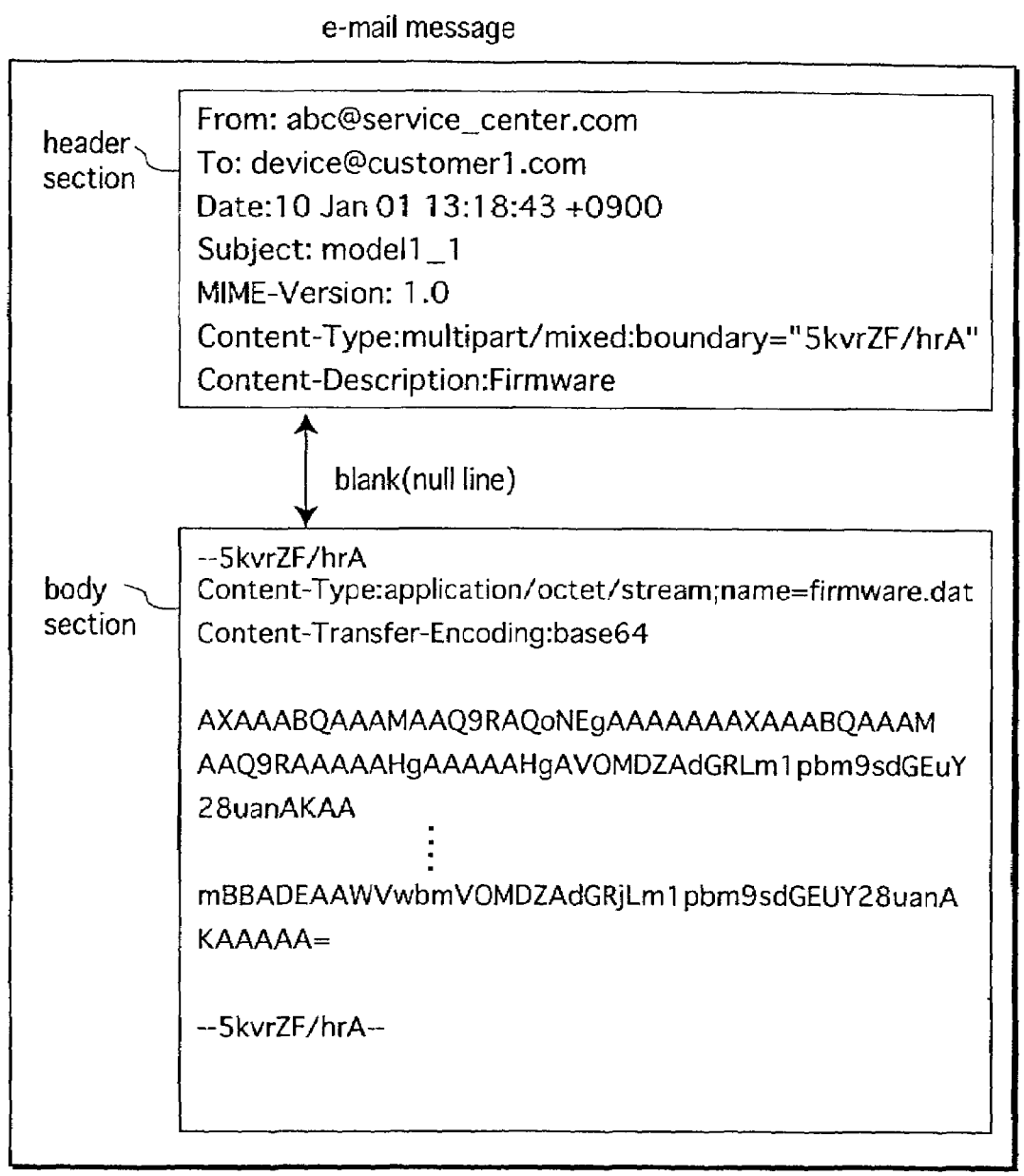
FIG. 10 shows an example of the contents of a message of e-mail to which firmware is attached.

FIG. 10 is a schematic drawing showing an example of the contents of a message of created e-mail.

As the figure shows, the message is divided into a header section and a body section, in compliance with IETF (Internet Engineering Task Force) standard for e-mail messages RFC (Request for Comments). Information such as the destination is written in the header section, and firmware is written in the body section.

The Subject field in the header section lists a character string in which the model name and the control module that were input by the administrator showing which firmware is to be sent are connected by an under bar.

The Content-Description field lists "Firmware". This shows that firmware is attached to the e-mail.

Note that since it is prohibited in RFC to list binary data in the message directly, the CPU 901 converts the firmware, which is originally binary data, to US-ASCII according to the commonly known Base 64 method. The resulting US-ASCII is written below a Content-Transfer-Encoding field that shows the method by which the binary data of the firmware has been converted.

Returning to FIG. 9, at step S29 the CPU 901 transmits the created e-mail. The CPU 901 connects to the mail server 83 using TCP/IP (Transmission Control Protocol/Internet Protocol), and transmits the e-mail to the mail server 83 according to SMTP. The e-mail that is transmitted to the mail server 83 is distributed via the Internet 50 to the destination read at step S27.

Note that when the model name read at step S25 and the model name read at step S21 are not the same (step S26, No), it is not necessary to transmit firmware, so the CPU 901 proceeds to step S30.

At step S30, the CPU 901 adds 1 to the current loop counter value i, here i=1, and returns to step S24.

At step S24, the CPU 901 judges whether i is equal to or less than n, and if so, the CPU 901 performs the processing from steps S25 to S30 for the apparatus registered i-th in the registration information table 96.

The CPU 901 repeats the processing from steps S25 to S30, successively transmitting e-mail until i is equal to n at step S24. Then, on judging that i is equal to n (step S24, No), the CPU 901 returns to the main routine. In this way, the firmware of the designated module number is transmitted to all the image processing apparatuses registered in the registration information table 96 having the same model name.

<1-6 Contents of Processing by the Printer Controller 12>

Figure 11:
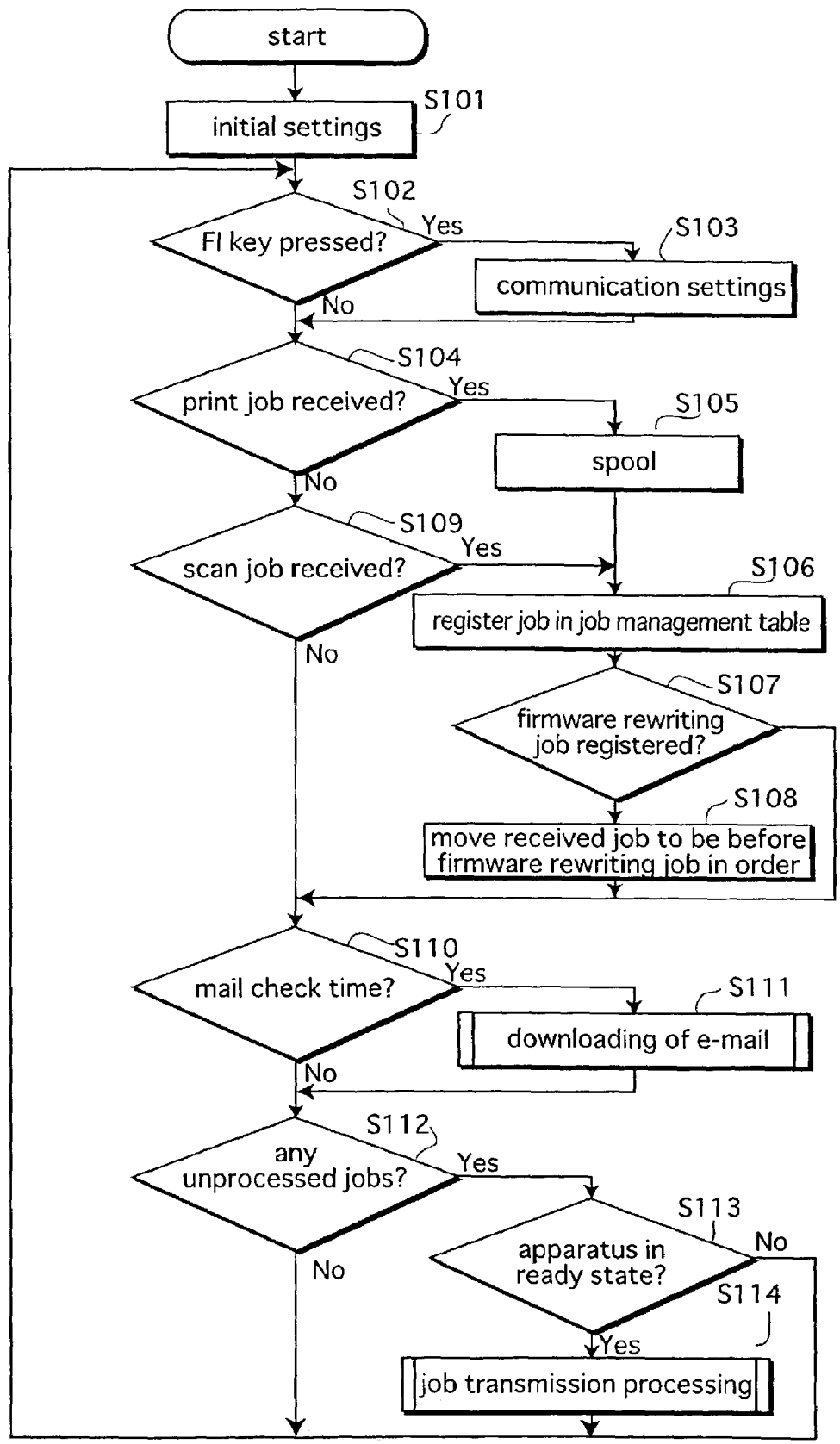
FIG. 11 is a flowchart showing the contents of processing executed by a CPU 201 of the printer controller 12.

FIG. 11 is a flowchart showing the content of basic processing executed by the CPU 201 of the printer controller 12.

As the figure shows, when the power is turned on, first the CPU 201 performs initialization processing of the internal memories the S-RAM 203 and the other internal memories, and of various parameters (step S101).

Then, the CPU 201 judges whether the F1 key on the operation panel 209 has been pressed. When the CPU 201 judges that the F1 key has been pressed (step S102, Yes), it performs communication settings for transmitting and receiving e-mail (step S103). Here, the CPU 201 has an input screen for communication settings displayed by the display unit in the operation panel, and has the user input settings such as the e-mail address of the mail server 43 and the image processing apparatus 1, and a time interval (hereinafter "interval T") for regularly checking whether new e-mail has arrived for the image processing apparatus 1. The CPU 201 has the input information stored in the NV-RAM 204. After the communication settings have finished, the CPU 201 proceeds to step S104.

At step S104, the CPU 201 judges whether a print job has been received. On judging that a print job has been received (step S104, Yes), the CPU 201 spools the data, and stores the data temporarily in the hard disk drive 205 (step S105), and refers to the job control information and the like to perform registration processing to register the information necessary for job management in the job management table 211 (step S106).

Furthermore, at step S109, the CPU 201 judges whether a scan request has been received from one of the client terminals 31 and 32, and when a scan request has been received, registers the received job next in the order in the job management table (step S109, Yes; step S106).

Figure 12A:
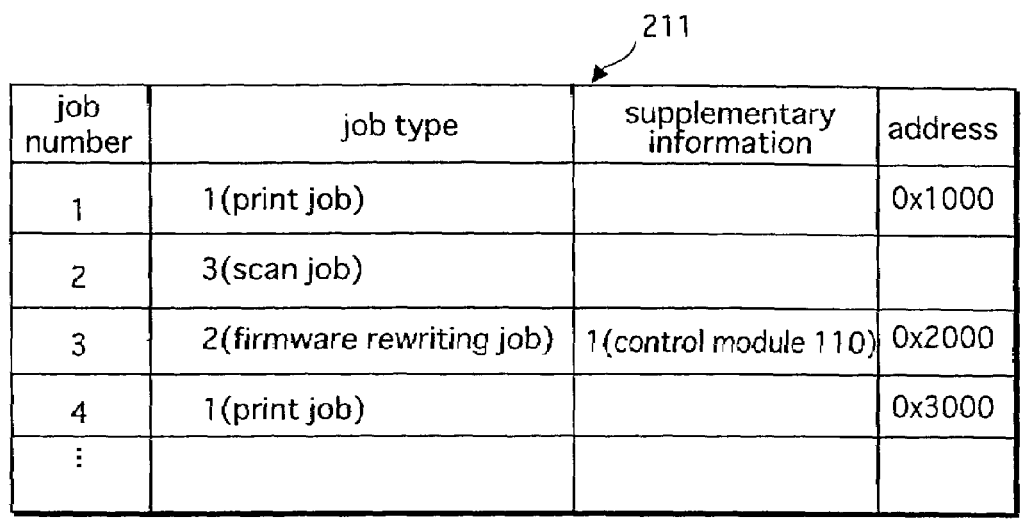
FIGS. 12A and 12B each show an example of a job management table used by the printer controller 12 for collectively managing print jobs, scan jobs and firmware rewriting jobs.

FIG. 12A shows an example of the registration content of the job management table 211.

As the figure shows, columns are provided in the job management table 211 for job number, job type, supplementary information, and address. Each time a new job is received, the CPU 201 adds a record showing the contents of the new job below the record that is currently at the bottom of the table. Consequently, the job numbers show the order in which the jobs were received.

A number showing the type of the job is written in the job type column. Specifically, "1" is written in the job type column when a print job is received from one of the client terminals 31 and 32, and "3" in the case of a scan job. Furthermore, "2", that shows that a job is a firmware rewriting job, is written in the job type column when firmware received from the service center 9 at step S131 (described later, see FIG. 13).

The number of a control module that is the target of firmware rewriting is written in the supplementary information column in the case of a firmware rewriting job. In the present embodiment the control modules 110 to 140 are set to correspond to numbers 1 to 4 respectively.

A memory address in the hard disk drive 205 showing where a received print job or received firmware is stored is written in the address column. Note that in the case of a scan job, the address column is blank since only a request for the scan job is received.

The job management table 211 is used for managing the execution order of jobs. The CPU 201 instructs execution of the jobs to the image forming apparatus 11 in order starting from that having the smallest job number, and then deletes the particular job from the job management table 211 each time it issues an execution instruction. Consequently, jobs that have not yet been executed, in other words unprocessed jobs that are place in a wait state, remain in the job management table 211.

Returning to FIG. 11, after completing registration to the job management table 211 at step S106, at step S107 the CPU 201 judges whether a firmware rewriting job is already registered in the job management table 211 (step S107).

When a firmware rewriting job is already registered, the CPU 201 reorders the job management table 211 the received print job or scan job so that it is higher in the order than the firmware rewriting job (step S107, Yes; step S108).

Figure 12B:
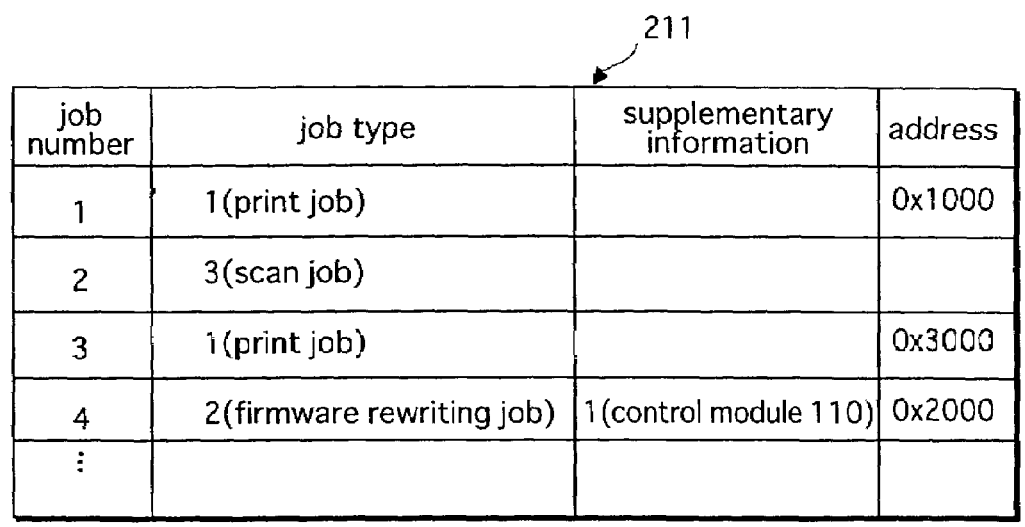

FIG. 12B shows a registration state of the job management table 211 after reordering. FIG. 12A shows that a print job having the job number 4 has been received after a firmware rewriting job having a job number 3. In order to have the print job higher in the order than the firmware rewriting job, the CPU 201 performs processing to make the print job job number 3 and the firmware rewriting job job number 4, as shown in FIG. 12B.

Accordingly, a firmware rewriting job always becomes subordinate in the execution order to a received print job or scan job. As has been described, a considerable amount of time is required to execute a firmware rewriting job. Therefore, scheduling a firmware rewriting job as described to be after print jobs and scan jobs in the execution order resolves the inconvenience of delay a print job or a scan job requested by a client.

Returning FIG. 11, at step S110, the CPU 201 judges whether it is time to check whether new e-mail has arrived for the image processing apparatus 1. Here, the CPU 201 checks for e-mail by communicating with the mail server 43 at the interval T set in the communication settings at step S103. Specifically, each time the CPU 201 finishes checking for e-mail, it activates an internal timer, and judges whether it is time to check for e-mail again by judging whether the count value of the time has reached the interval T.

On judging at step S110 that it is time to check for new e-mail (step S110, Yes), the CPU 201 resets the timer and executes e-mail downloading processing (step S111). This processing is processing for registering a firmware rewriting job in the job management table 211 when firmware is attached to a downloaded e-mail. This processing is described in detail later.

At step S112, the CPU 201 judges whether there are any jobs registered in the job management table 211, in other words whether there are any unprocessed jobs. On judging that there are unprocessed jobs (step S112, Yes), the CPU 201 inquires to the image forming apparatus 11 about whether the image forming apparatus 11 is in a ready state (in other words, whether it is in a state in which it can execute the next job), and if so (step S113, Yes), the CPU 201 executes job transmission processing (step S114). This job transmission processing, as is described later, is processing for instructing the image forming apparatus 11, for example, to execute print processing when the job that is registered at the top of the job management table 211 is a print job, and firmware rewriting processing when the job that is registered at the top of the job management table 211 is a firmware rewriting job.

On the other hand, when there are no unprocessed jobs, in other words on judging that there are no jobs registered in the job management table 211 (step S112, No), the CPU 201 returns to step S102. Furthermore, at step S113, when the image forming apparatus 11 is not in a ready state, the CPU 201 cycles through the routine, and on judging at step S113 that the image forming apparatus 11 is in a ready state, has the job transmission processing at step S114 executed.

The following describes the contents of the e-mail downloading processing sub-routine at step S111 and the job transmission processing sub-routine at step S114.

Figure 13:
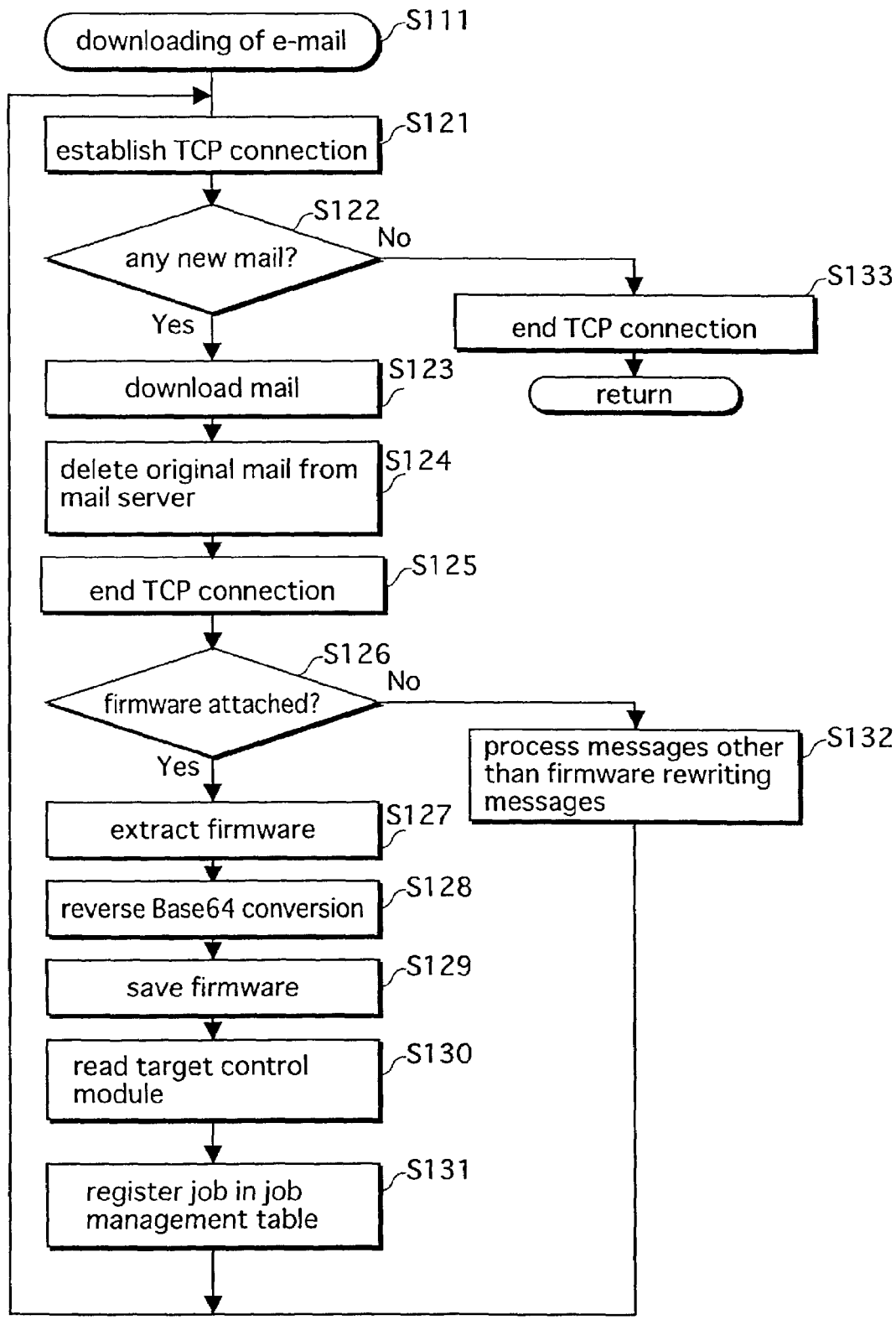
FIG. 13 is a flowchart showing processing performed by the printer controller 12 at S111 in FIG. 11 when downloading e-mail.

FIG. 13 is a flowchart showing the contents of the mail downloading processing sub-routine at step S111 in FIG. 11.

As the figure shows, the CPU 201 connects to the mail server 43 using TCP/IP protocol (establishment of TCP connection) (step S121), and after confirming that new e-mail has arrived (step S122, Yes), downloads the e-mail (step S123). POP 3 (Post Office Protocol 3) is used in the downloading processing. Note that when a plurality of e-mails have arrived, the CPU 201 downloads only one.

In order that the downloaded e-mail can be treated in the mail server 43 as having been downloaded (in other words, not new), the CPU 201 performs processing to delete the downloaded e-mail from the server (step S124), and ends the TCP connection with the mail server 43 (step S125).

Next, the CPU 201 judges whether new firmware for rewriting is attached to the downloaded e-mail (step S126). The CPU 201 makes this judgement according to whether there is a Content-Description field in the header section and whether "Firmware" is listed in the Content-Description field.

When the CPU 201 judges that firmware is attached (step S126, Yes), it extracts the part in the body section that corresponds to the firmware (step S127). As has been described, the data of the firmware has been converted to US-ASCII code according to Base 64 conversion in order to be attached to the e-mail. Therefore, the CPU 201 converts the character string back to binary data according to reverse Base64 conversion (step S128), and then stores the resulting binary data in the hard disk drive 205 (step S129).

Next, the CPU 201 extracts the model name and the module number that are the target of rewriting, from the value of the Subject field in the header section of the message (step S130), and registers information showing the content of processing for rewriting the firmware in the job management table 211 as "firmware rewriting job" (step S131). Specifically, as shown in FIG. 12A, the CPU 201 writes a number "2" that shows a firmware rewriting job in the job type column, writes a value showing the module number that is the target of rewriting in the supplementary information column, and writes the memory address in the hard disk drive 205 at which the firmware is stored in the address column.

After ending the processing for the job management table at step S131, the CPU 201 returns to step S121. On the other hand, when the CPU 201 judges at step S126 that firmware is not attached to the downloaded e-mail, the CPU 201 proceeds to step S132, and executes processing for when e-mail for purposes other than firmware rewriting is received. For example, in the case of a message instructing the CPU 201 to move into power-saving mode, the CPU 201 executing processing to move into that mode. The CPU 201 then returns to step S121.

Next, at step S121 and S122, the CPU 201 performs processing to check whether new e-mail has arrived, and repeats the processing at steps S123 to S133 until there is no hew e-mail (step S122, No). Then the CPU 201 ends the connection with the mail server 43 (step S134), and returns to the main routine shown in FIG. 11.

Figure 14:
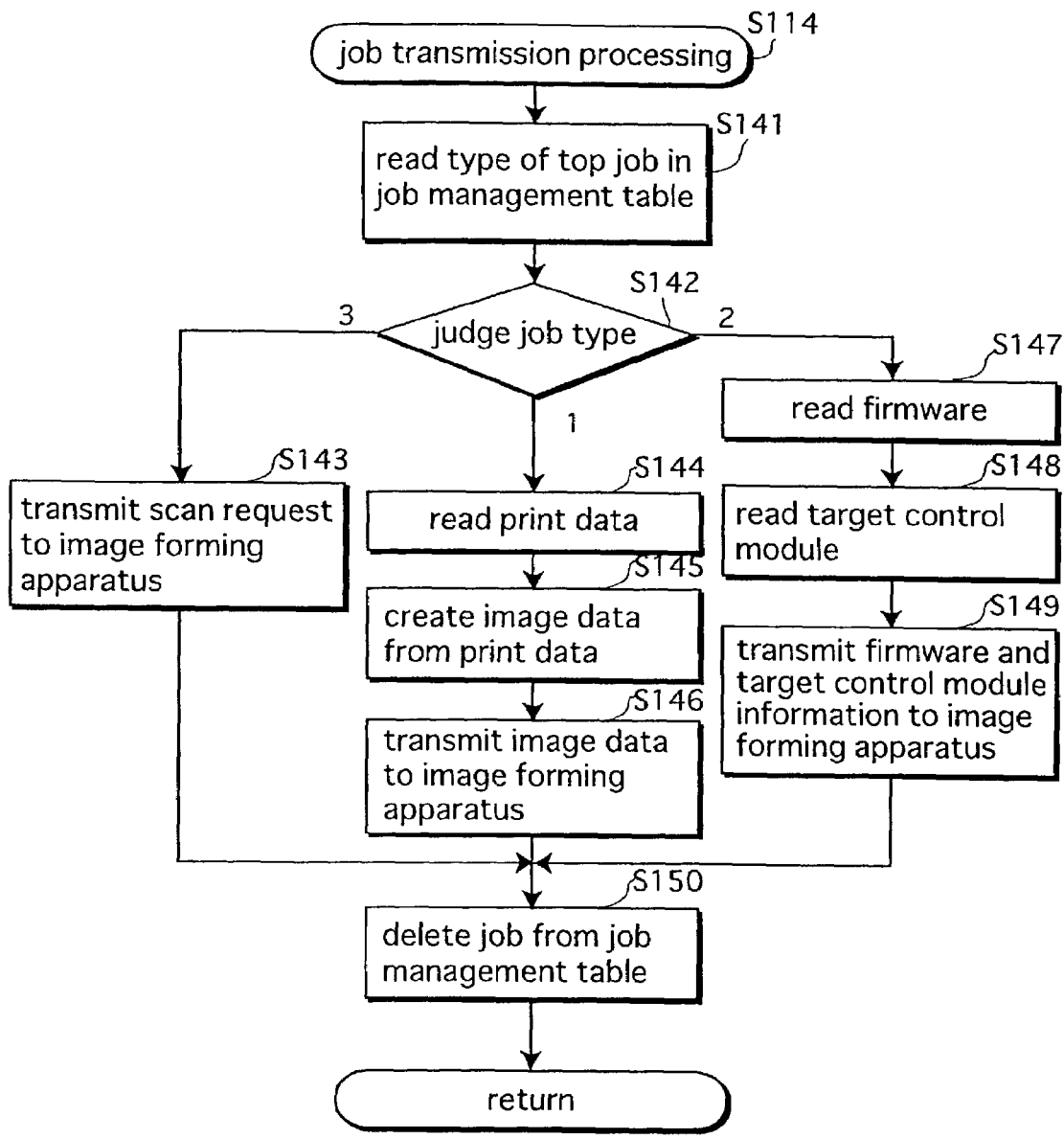
FIG. 14 is a flowchart showing processing performed by the printer controller 12 at step S114 in FIG. 11 for transmitting an unprocessed job that is registered in the job management table to the image forming apparatus 11.

FIG. 14 is a flowchart showing the contents of the job transmission processing sub-routine at step S114 in FIG. 11.

As the drawing shows, first the CPU 201 reads the type of the job at the top of the job management table 211 (job number 1) (step S141), and distinguishes the job type (step S142)

When the job type is "3", which represents a scan request, the CPU 201 transmits the scan request to the image forming apparatus 11 (step S143). When the job type is "1", which represents a print job, the CPU 201 reads the print data from the hard disk drive 205, based on the memory address, and after the print data is expanded to image data in the image data expansion unit 208, the CPU 201 transmits the image data to an image forming apparatus 11 (step S145, S146). When the job type is "2", which represents a firmware rewriting job, the CPU 201 reads the firmware data from the hard disk drive 205, based on the memory address of the firmware data, as well as reading the information (a number from 1 to 4) about the target control module from the supplementary information column in the job management table 211 (steps S147, S148), and transmits the firmware and the target control module information to the image processing apparatus 11 (step S149).

Next, the CPU 201 deletes the job transmitted at either steps S143, S146 or S149 from the job management table 211 (step S150), and returns to the main routine shown in FIG. 11.

<1-7 Contents of Processing Performed by the Image Forming Apparatus 11>

Figure 15:
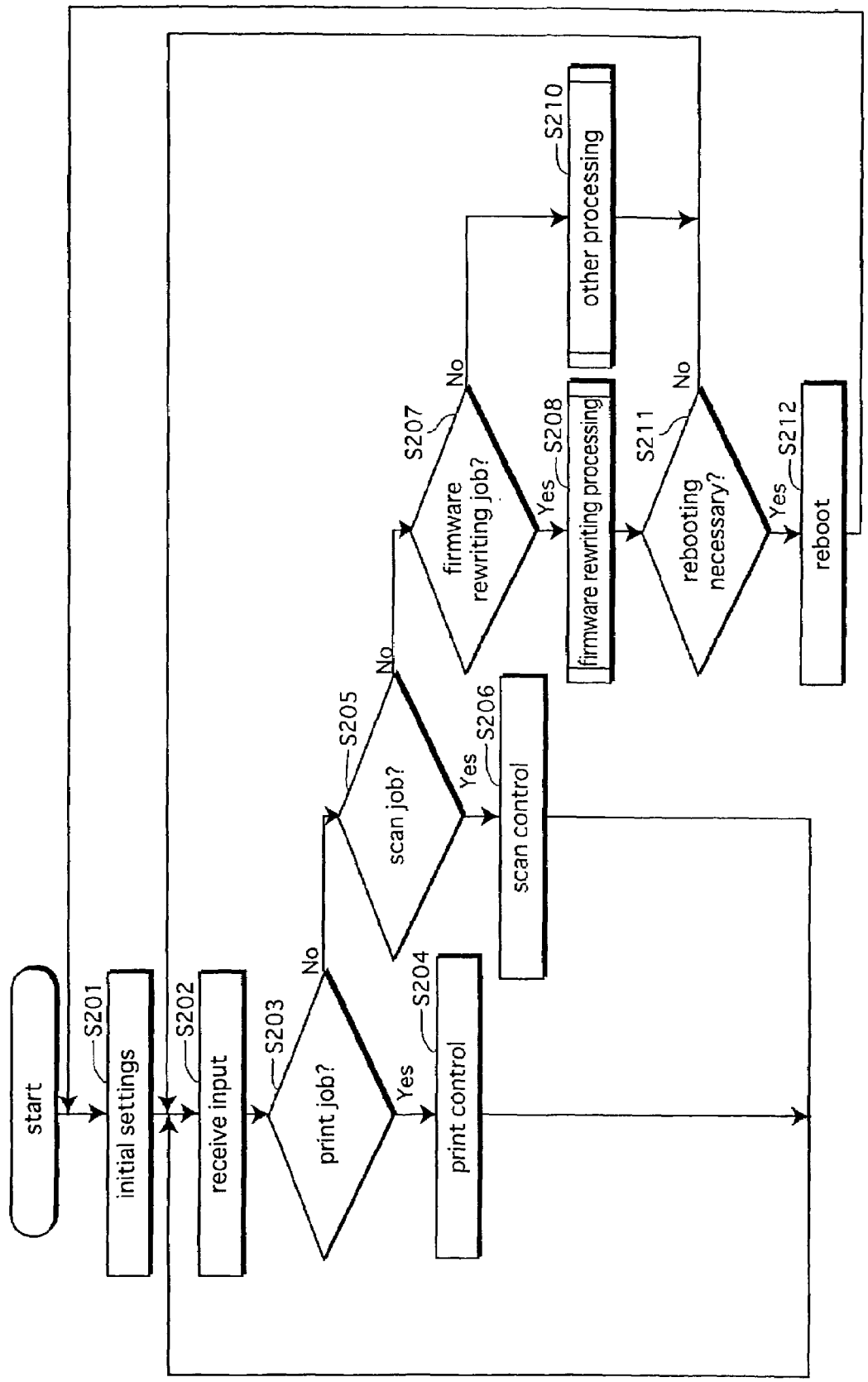
FIG. 15 is a flowchart showing basic processing executed in the image forming apparatus 11.

FIG. 15 is a flowchart showing the contents of processing executed by the CPU 111 and so on in the control unit 100 of the image forming apparatus 11.

As the figure shows, when the image forming apparatus 11 is turned on, the CPU 111 initializes the S-RAM 113 and other internal memories in the control module 110, and various parameters and so on. The CPU 111 also has the CPUs 121 to 141 of the control modules 120 to 140 execute the same kind of initialization processing (step S201).

Next, the image forming apparatus 11 receives input of various types of signals (step S202). When a print job has been received from the printer controller 12 (step S203, Yes), the CPU 111 executes print control for forming an image based on the received image data (step S204), and returns to step S202. When the received job is a scan job (step S203, No; S205, Yes), the CPU 111 executes reading scan control to have the image reader unit 160 read an image of the document set on the document platform (step S206), and returns to step S202. Note that the image data read by the image reader unit 160 is transmitted via the printer controller 12 to the client terminal that requested the scan job.

Furthermore, when a firmware rewriting job is received (step S205, No; step S207, Yes), the CPU 111 executes firmware rewriting processing for rewriting the control module, based on the received firmware data (step S208). Then, the CPU 111 judges whether it is necessary to reboot (step S211), and if so, reboots (step S212), returns to step S201 and starts processing from the initial settings. When the CPU 211 judges at step S211 it is not necessary to reboot, there is no need for the initial settings, so the CPU 111 returns to step S202.

Note that at step S211, the CPU 111 judges that it is necessary to reboot because there are cases in which rewriting is not executed in the firmware rewriting processing, or the rewriting fails. The CPU 111 judges that it is not necessary to reboot in such cases.

Furthermore, at step S207, when the CPU 111 judges that a firmware rewriting job has not been received, it performs other processing, such as display control of the display unit in the operation panel 119, and returns to step S202.

Figure 16:
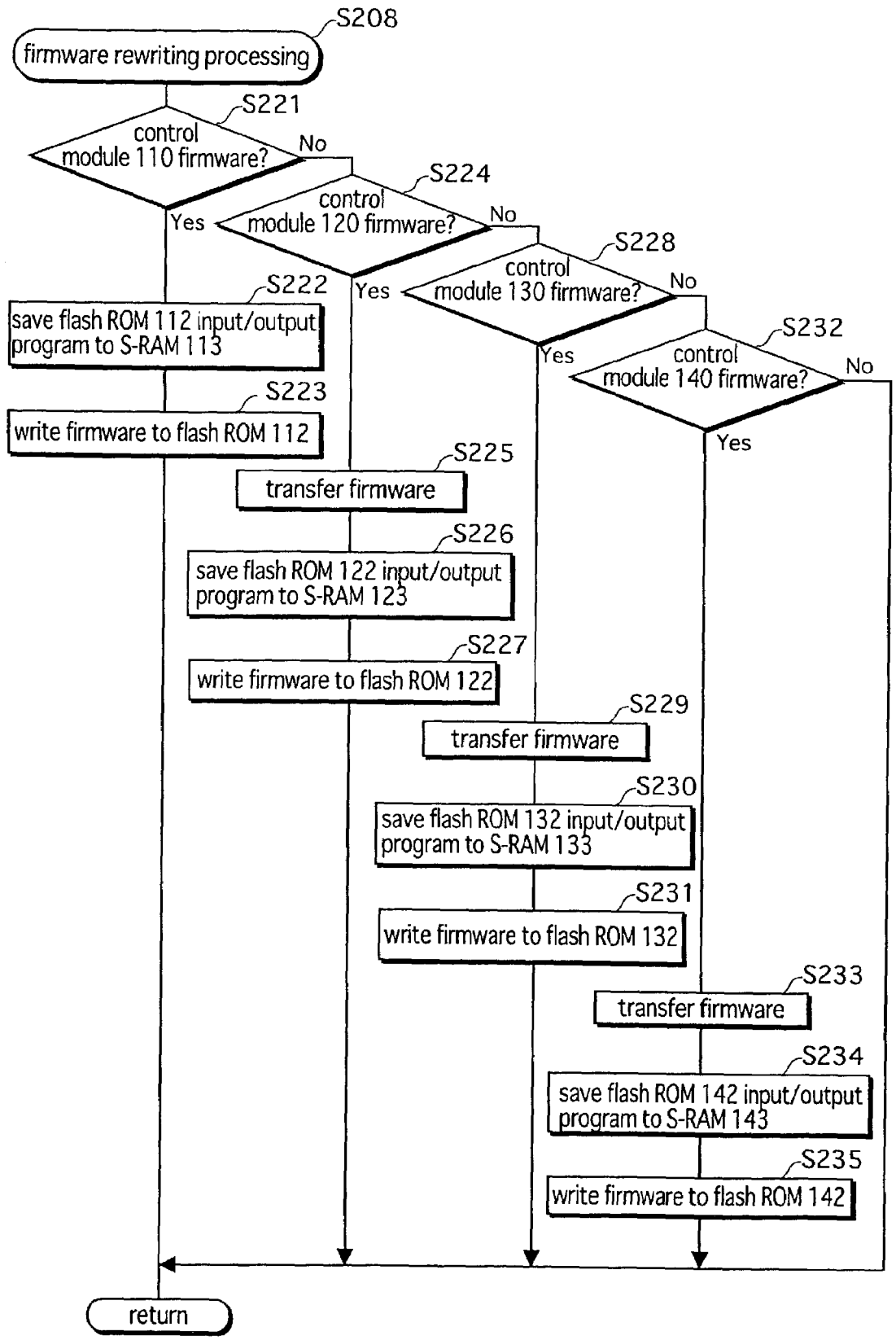
FIG. 16 is a flowchart showing firmware rewriting processing at step S208 in FIG. 16.

FIG. 16 is a flowchart showing the contents of a firmware rewriting processing sub-routine at step S208.

As the figure shows, the CPU 111 and so on confirm which control module, according to the number (1 to 4) showing the target control module, the firmware corresponds to, and execute processing to write the firmware to the flash ROM of the corresponding control module.

In other words, on judging that the firmware corresponds to the control module 110 (step S221, Yes), the CPU 111 saves the input/output program which includes a firmware rewriting program and that is currently stored in the flash ROM 112 (hereinafter referred to simply as an "input/output program"), to the S-RAM 113 (step S222), and overwrites the firmware to the flash ROM 112, using the input/output program (step S223). On the other hand, on judging that the received firmware corresponds to the control module 120 (step S221, No; step S224, Yes), the CPU 111 transfers the firmware to the control module 120 (step S225). The CPU 121 saves the input/output program that is stored in the flash ROM 122 to the S-RAM 123 (step S226), and overwrites the firmware to the flash ROM 122, using the input/output program (step S227).

Furthermore, on judging that the received firmware corresponds to the control module 130 (step S224, No; step S228, Yes), the CPU 111 transfers the firmware to the control module 130 (step S229). The CPU 131 saves the input/output program that is stored in the flash ROM 132 to the S-RAM 133 (step S230), and overwrites the firmware to the flash ROM 132, using the input/output program (step S231).

Furthermore, on judging that the received firmware corresponds to the control module 140 (step S228, No; step S232, Yes), the CPU 111 transfers the firmware to the control module 140 via the control module 130 (step S233). The CPU 141 saves the input/output program that is stored in the flash ROM 142 to the S-RAM 143 (step S234), and overwrites the firmware to the flash ROM 142, using the input/output program (step S235).

After the rewriting processing, the CPU 111 returns to the main routine shown in FIG. 15, judges at step S211 that rebooting is necessary, and performs rebooting processing for temporarily turning the apparatus off and then turning it on again (step S212). Then, initial setting is executed (step S201), and subsequent control is performed according to the firmware after rewriting.

Note that when the CPU 111 judges that the received firmware does not correspond to any of the control modules 110 to 140 (step S232, No), it returns to the main routine shown in FIG. 15. In this case it is judged that rebooting is not necessary, therefore rebooting is not executed.

As has been described, according to the first embodiment of the present invention, in cases in which unexecuted firmware rewriting jobs exist when an image processing job is received, the image processing job is always executed with priority. Therefore, a user who transmitted the image processing job is not made to wait in vain for a long time due to firmware rewriting processing.

Conventionally, when, such as in the present embodiment, a sender of a firmware rewriting job and a sender of an image processing job differ, it is necessary for the user to go to the trouble of performing operations to confirm whether a firmware rewriting job has been received, and change the order of the jobs, in order to have their own image processing job executed with priority over the firmware processing job. However, in the present embodiment the image processing job is automatically processed with priority. Therefore, delays in execution of image processing jobs due to firmware rewriting can be avoided without a burden on the user.

Second Embodiment

In the first embodiment execution of print jobs is always given priority over execution of firmware jobs. However, there are cases in which firmware rewriting processing is executed before print job processing because the time required for the rewriting processing is short and therefore does not cause significant delays in the print job processing. Accordingly, a feature of the present embodiment is that the time necessary to execute a firmware rewriting job is found, and the execution order of jobs altered according to the length of the rewriting job.

Consequently, the structures of the apparatuses and so on are the same as those in the first embodiment, while the job management control content differs. The following description focuses on the aspects of the second embodiment that differ from the first.

Figure 17:
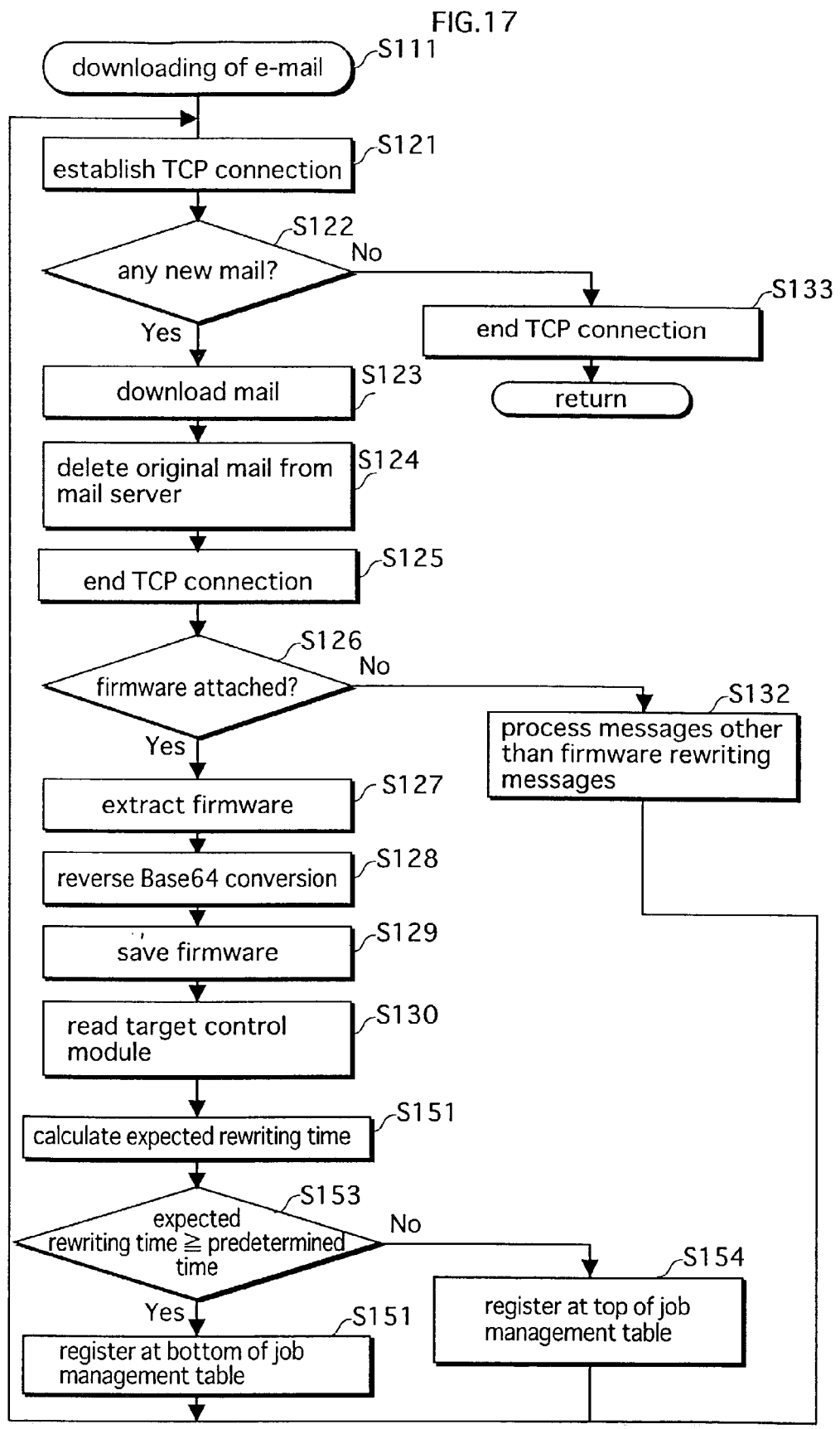
FIG. 17 is a flowchart showing contents of processing in the print controller 12 for downloading e-mail in a second embodiment of the present invention.

FIG. 17 is a flowchart showing an e-mail downloading processing (see FIG. 11, step S111) sub-routine in the present embodiment. Steps numbers that are the same as those in FIG. 13 (step S121 to S130, S132) represent the same processing contents, and therefore descriptions thereof are brief (this is also applies to other flowcharts).

In the first embodiment, firmware that was attached to e-mail is stored in the hard disk drive 205 (FIG. 5), and the number of the control module that is the target of firmware rewriting is read from the "Subject" in the header section of the message. Then, the firmware rewriting job is automatically registered at the bottom of the job management table 211 (see FIG. 13, steps S129, S130 and S131). However, in the present embodiment, after step S130 the time expected to be required to execute rewriting of the firmware (expected rewriting time) is calculated (FIG. 17, step S151).

Here, the expected rewriting time can be easily found by multiplying a rewriting time per unit of size (unit rewriting time) by the data size of the firmware. An appropriate value for the unit rewriting time is set in advance in the NV-RAM 204 as an initial value, and updated as necessary, as is described later.

Furthermore, the data size of the firmware is found easily according to a well known method. For example, by referring to the respective memory addresses in the hard disk drive 205 where the firmware starts and ends.

Next, at step S152, the CPU 201 judges whether the expected rewriting time is equal to or more than predetermined time. The predetermined time is determined by a user who sets an appropriate time, for example 10 minutes, that he/she will allow execution of his/her requested print jobs to be delayed. It is possible to have a structure in which the user may change this predetermined time freely using the operation panel 209 of the print controller 12, according to his/her work environment.

At step S152, when the expected rewriting time for the firmware is equal to or more than the predetermined time, the CPU 201 registers the firmware rewriting job at the bottom of the job management table 211 (step S153). This is to take into account users who have already requested print jobs. When the expected rewriting time is less than the predetermined time, the CPU 201 registers the firmware rewriting job at the top of the job management table 211, giving priority to execution of the firmware rewriting job (step S154). The CPU 201 then returns to step S121.

In this way, taking the firmware rewriting time into account, and comparing this time with a predetermined time, firmware rewriting demands and the user's print job execution demands can be coordinated rationally, and the schedule for execution of firmware rewriting jobs modified adequately.

Figure 18:
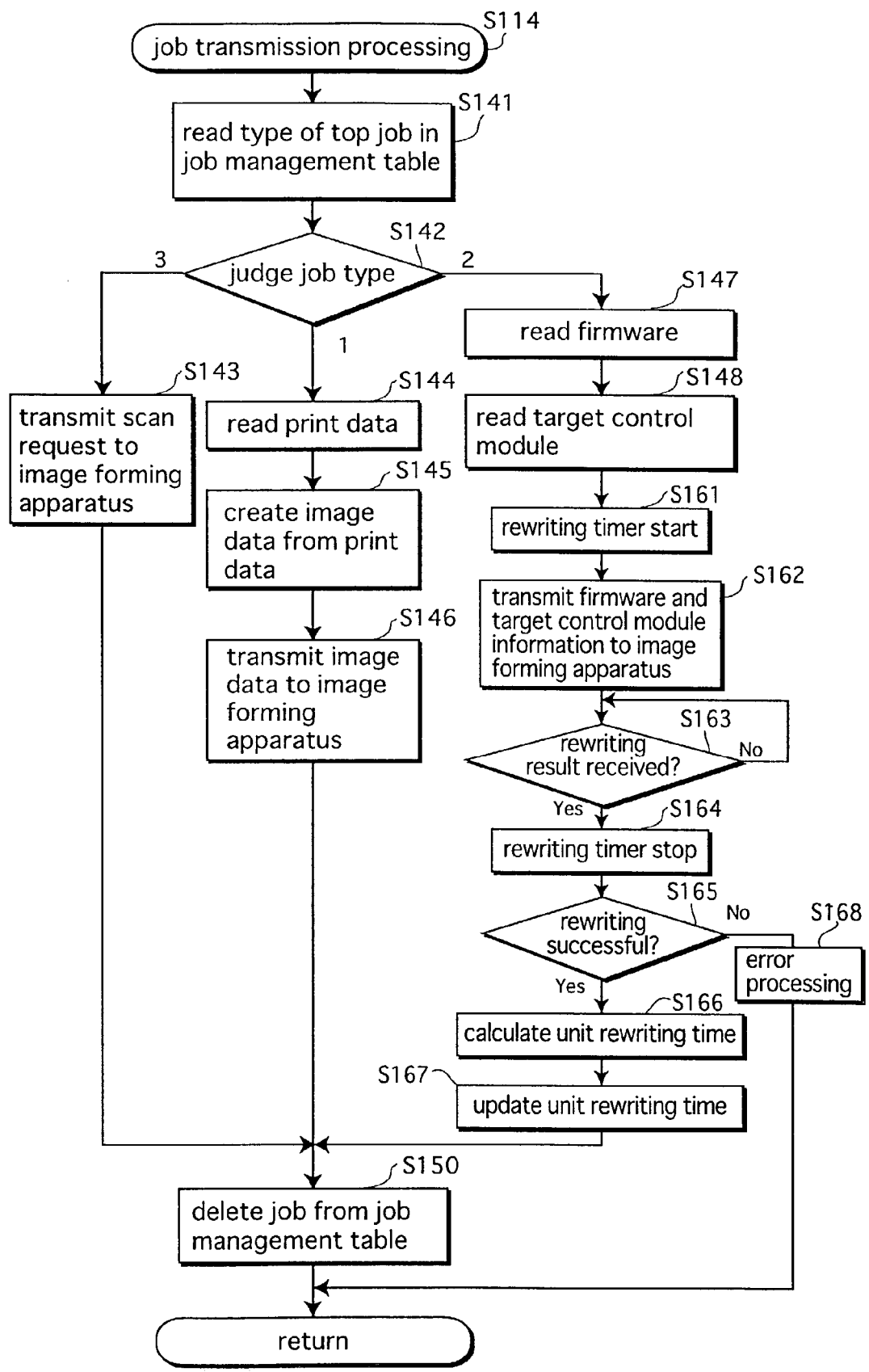
FIG. 18 is a flowchart showing processing executed in the print controller 12 for transmitting an unprocessed job to the image forming apparatus 11, in the second embodiment of the present invention.

FIG. 18 is a flowchart showing contents of a job transmission processing (see FIG. 11, step S114) sub-routine in the present embodiment. This processing differs from that in the first embodiment (FIG. 14) in that it has additional steps (steps S161, S163 to S167) of processing for updating the unit rewriting time, in order to calculate the expected rewriting time for the firmware.

As the figure shows, in the job transmission processing, first the CPU 201 reads the type of the job at the top (job number 1) in the job management table 211 (step S141), and judges what the job type is (step S142).

When the job type is "3", meaning that the job is a scan request, the CPU 201 transmits the scan request to the image forming apparatus 11 (step S143). When the job type is "1", meaning that the job is a print job, the CPU 201 reads the print data of the job from the hard disk drive 205, based on the memory address, and after having the print data expanded into image data in the image data expansion unit 208, transmits the image data to the image forming apparatus 11 (steps S145, S146). Furthermore, when the job type is "2", meaning that the job is a firmware rewriting job, the CPU 201 reads the firmware from the hard disk drive 205, based on the memory address, as well as reading the number of the control module (a number from 1 to 4) that is the target of rewriting, from the supplementary information column in the job management table 211 (steps S147, S148).

Next, the CPU 201 starts its internal timer, as a rewriting time timer (step S161), and transmits the firmware and information about the target control module to the image forming apparatus 11 (step S162).

As is described later, the image forming apparatus 11 has a structure in which, after the firmware rewriting has ended in each of the modules, rewriting results (specifically values of checksums 1 and 2, described in detail later) are notified to the print controller 12. At step S163, the CPU 201 waits for notification of the rewriting results from the image forming apparatus, and stops the timer on receiving the rewriting results (step S164). Next, the CPU 201 judges from the rewriting results whether firmware rewriting succeeded (step S165). Specifically, the CPU 201 judges rewriting to be have been successful when the checksums 1 and 2 are equal, and judges rewriting to have failed when the checksums 1 and 2 differ. When rewriting is successful, the CPU 201 calculates the actual time required for rewriting per unit of data by dividing the time measured by the timer by the data size of the firmware (step S166). The CPU 201 overwrites the unit rewriting time stored in the NV-RAM 204 with the obtained value (step S167). Accordingly, the actual time required for rewriting the transmitted firmware is known, enabling the expected rewriting time to be calculated more accurately at step S151 in FIG. 17.

Note that when rewriting is judged to have failed at step S165, the CPU 201 proceeds to step S168, and after performing error processing, returns to the main routine shown in FIG. 11. Here, error processing is, for example, processing for prohibiting subsequent execution of jobs in the image forming apparatus 11, as well as having a message such as "Firmware rewriting processing failed. Contact service center." displayed on the display unit of the operation panel 209.

After transmitting a scan request to the image forming apparatus 11 at step 143, after transmitting image data to the image forming apparatus 11 at step 146, or after updating the firmware unit rewriting time at step S167, the CPU 201 moves to step S150 where it deletes the job whose processing has finished from the job management table 211, and returns to the main routine.

Figure 19:
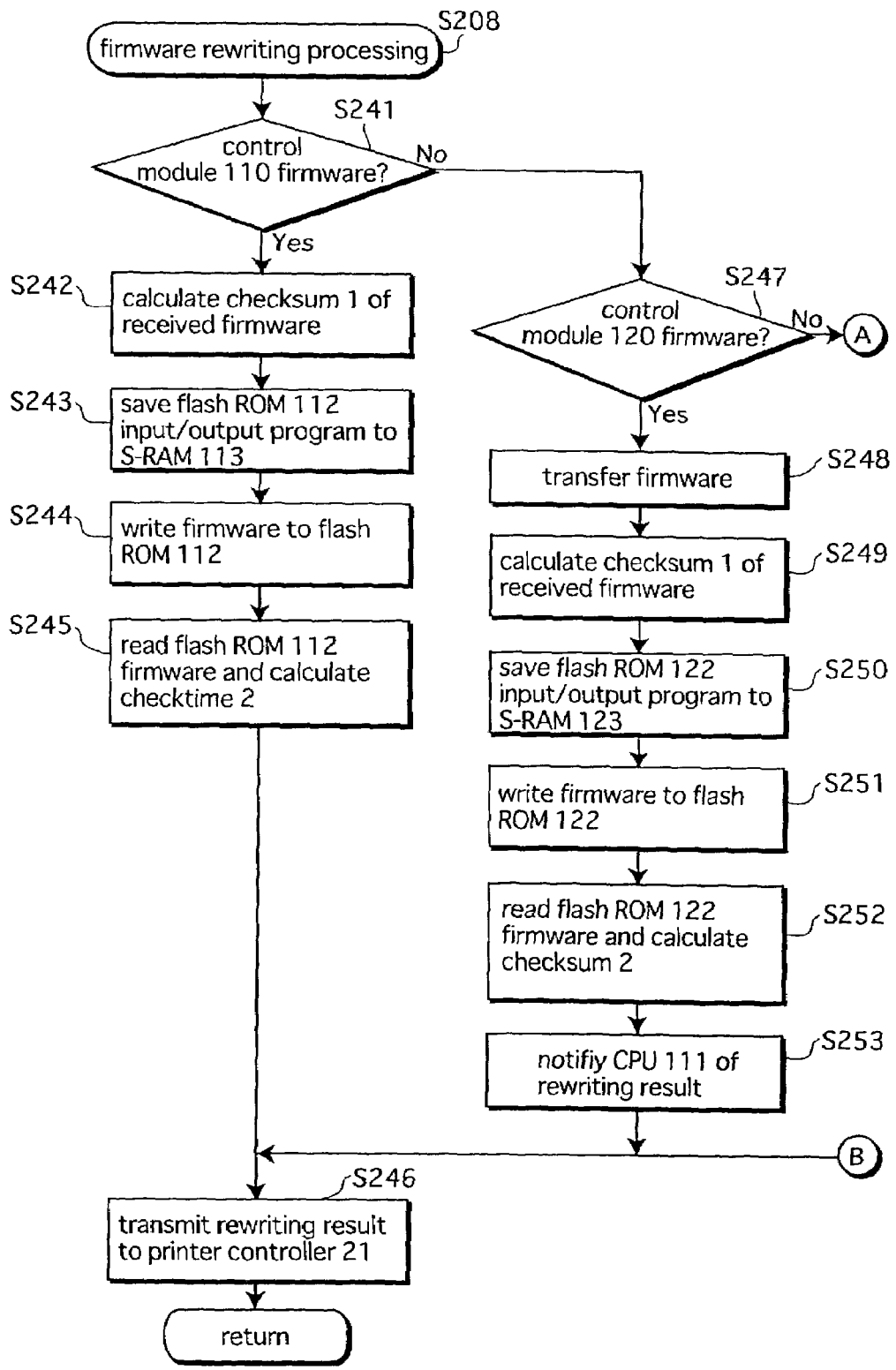
FIG. 19 is a flowchart showing firmware rewriting processing executed in the image forming apparatus 11, in the second embodiment of the present invention.
Figure 20:
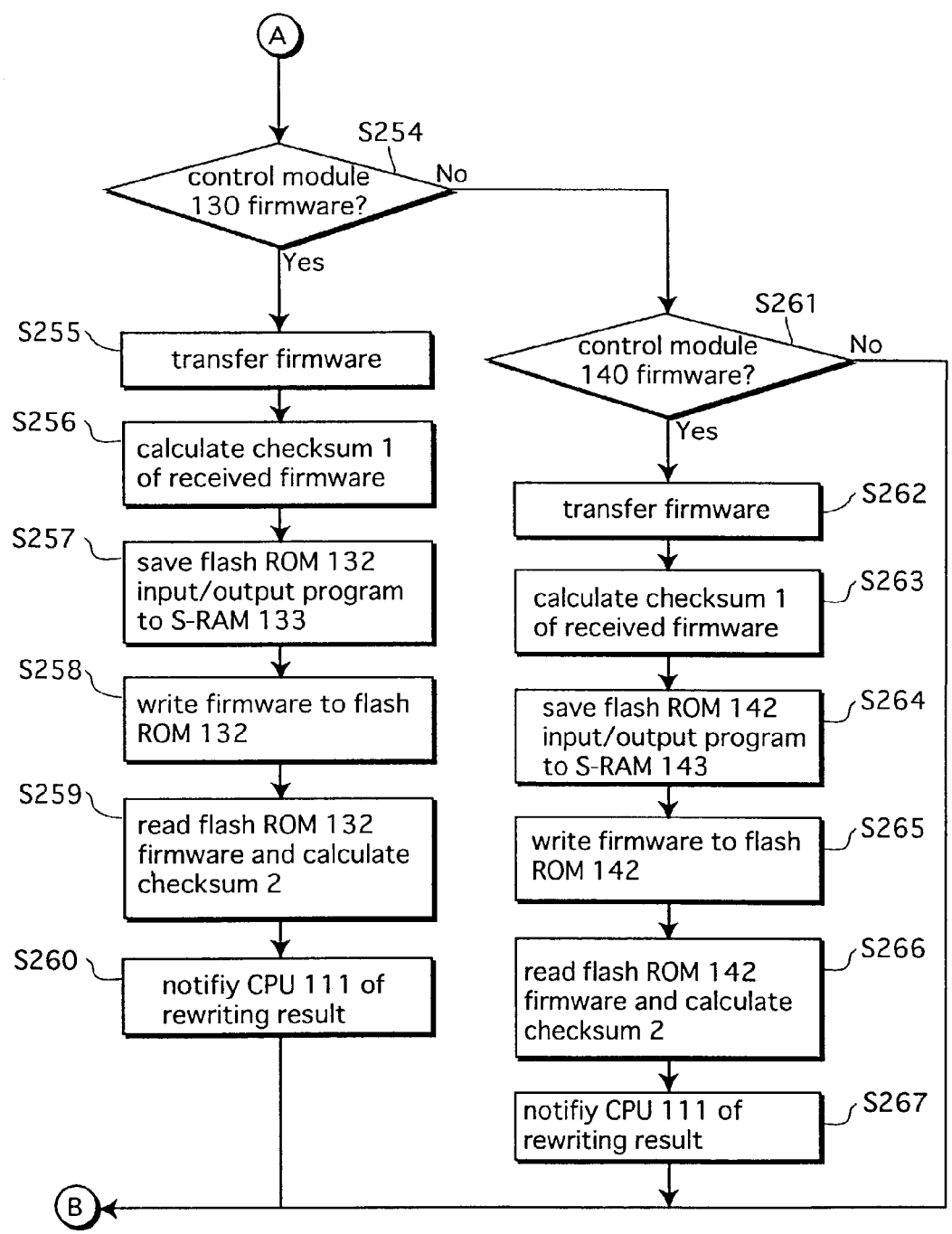
FIG. 20 is a flowchart that is a continuation of the flowchart in FIG. 19.

FIG. 19 and FIG. 20 are flowcharts showing the firmware rewriting processing (see FIG. 15, step S208) sub-routine in the present embodiment.

First, the CPU 111 judges whether received firmware is for the control module 110 (step S241).

When the firmware is for the control module 110, the CPU 111 applies a checksum to the data of the received firmware, and stores the result (hereinafter the checksum when storing to the memory is referred to as "checksum 1") to the S-RAM 113 (step S241, Yes; step S242).

Next, after saving the input/output program in the flash ROM 112 to the S-RAM 113, the CPU 111 writes the received firmware data to the flash ROM 112 (step S243, S244). After the writing has ended, the CPU 111 reads the firmware data that has been newly written to the flash ROM 112 and applies a checksum (hereinafter the checksum when reading from the memory is referred to as "checksum 2") to the read firmware data (step S245).

When the received firmware data received is not firmware for the control module 110 at step S241, the CPU 111 judges whether the firmware is for the control module 120 (step S241, No; step S247). When the firmware is for the control module 120, the CPU 111 transfers the firmware to the control module 120. The CPU 121 calculates the checksum 1 of the firmware, and stores the result in the S-RAM 123 (step S247, Yes; steps S248 and S249).

After saving the input/output program in the flash ROM 122 to the S-RAM 123, the CPU 121 writes the received firmware to the flash ROM 122 (steps S250, S251).

After the writing has ended, the CPU 121 reads the firmware data that has been newly written to the flash ROM 122 and applies a checksum 2 to the read firmware data (step S252). The CPU 121 then notifies the checksums 1 and 2 to the CPU 111 as the rewriting results (step S253).

When the received firmware data is not firmware for the control module 120 at step S247, the CPU 111 moves to step S254 in FIG. 20, and judges whether the firmware is for the control module 130.

When the firmware is for the control module 130, the CPU 111 transfers the firmware to the control module 130 (step S255). The CPU 131 calculates the checksum 1 of the firmware, and stores the result in the S-RAM 133 (step S256).

After saving the input/output program in the flash ROM 132 to the S-RAM 133, the CPU 131 writes the received firmware to the flash ROM 132 (steps S257, S258).

After the writing has ended, the CPU 131 reads the firmware data that has been newly written to the flash ROM 132 and calculates a checksum 2 of the read firmware data (step S259). The CPU 131 then notifies the checksums 1 and 2 to the CPU 111 as the rewriting results (step S260).

When the received firmware data is not firmware for the control module 130 at step S254, the CPU 111 moves to step S261, and judges whether the firmware is for the control module 140. When the firmware is for the control module 140, the CPU 111 transfers the firmware to the control module 140 (step S262). The CPU 141 calculates the checksum 1 of the firmware, and stores the result in the S-RAM 143 (step S263). After saving the input/output program in the flash ROM 142 to the S-RAM 143, the CPU 141 writes the received firmware to the flash ROM 142 (steps S264, S265).

After the writing to the flash ROM 142 has ended, the CPU 141 reads the firmware data that has been newly written to the flash ROM 142 and calculates a checksum 2 of the read firmware data (step S266). The CPU 141 then notifies the checksums 1 and 2 to the CPU 111 as the rewriting results (step S267).

Returning to FIG. 19, at step S246, the CPU 111 notifies the rewriting results of the firmware rewriting executed in the control modules 110 to 140 (in other words, the CPU 111 notifies the respective values of the checksums 1 and 2 in the control module in which rewriting was executed) to the printer controller 12, and returns to the main routine in FIG. 15.

In this way, the printer controller 12 judges whether firmware rewriting has succeeded or failed, based on the rewriting results reported by the image forming apparatus 11, and updates the unit rewriting time when rewriting succeeds (FIG. 18, steps S165 to S167). As has been described, according to the present embodiment, even in cases where the sender of the firmware rewriting job and the sender of the image processing job differ, the user who transmitted the image processing job does not need to take the effort to check whether the image processing apparatus has received a firmware rewriting job, or to perform operations to change the order of jobs. Since the execution order of image processing jobs and firmware rewriting jobs is automatically changed, by judging whether a firmware expected rewriting time is equal to or more than a predetermined time, firmware rewriting demands and the user's print job execution demands can be coordinated rationally without placing a burden on the user, and execution of image processing jobs is not delayed any longer than necessary.

Third Embodiment

Figure 21:
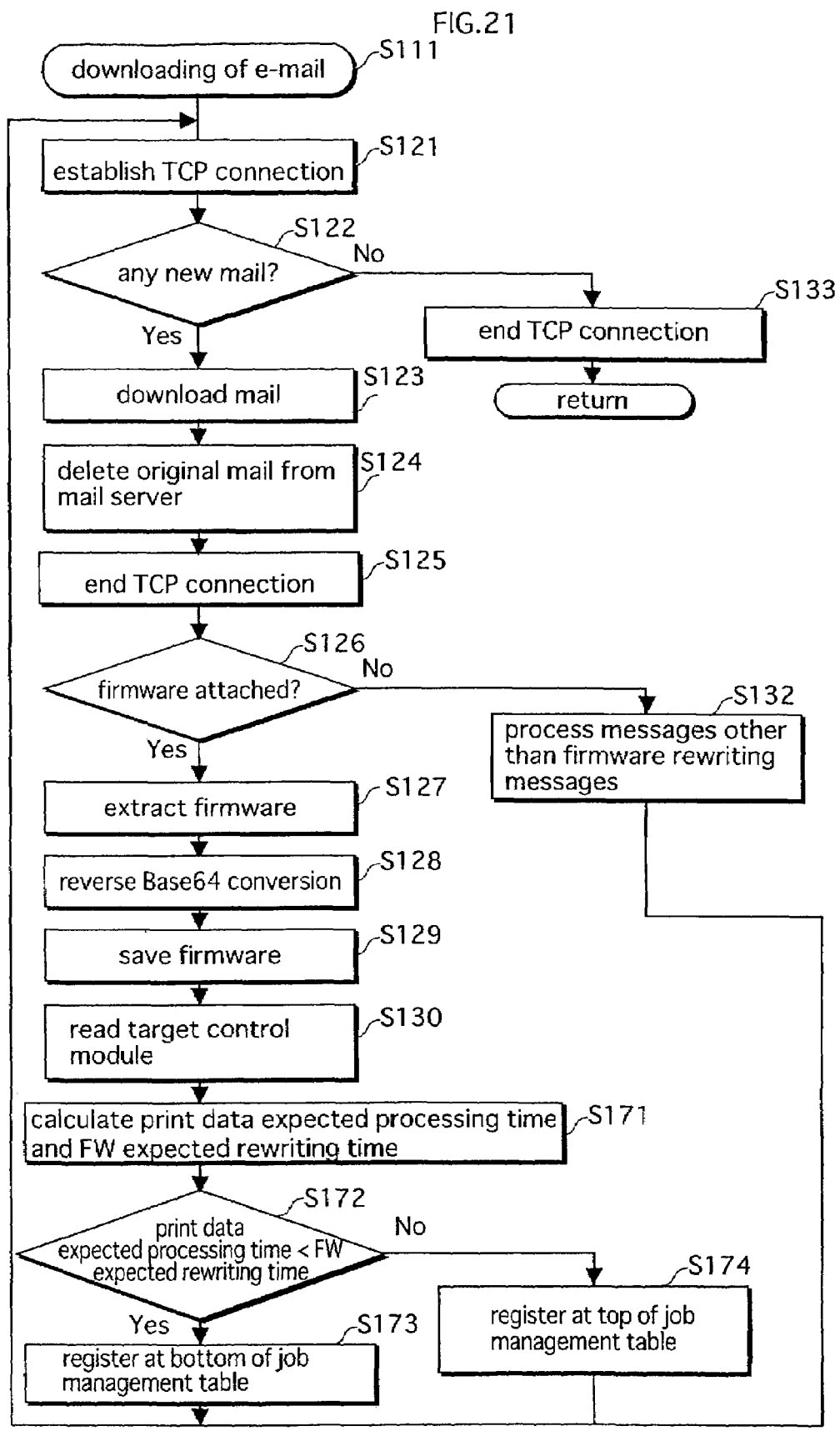
FIG. 21 is a flowchart showing contents of processing in the print controller 12 for downloading e-mail in a third embodiment of the present invention.
Figure 22:
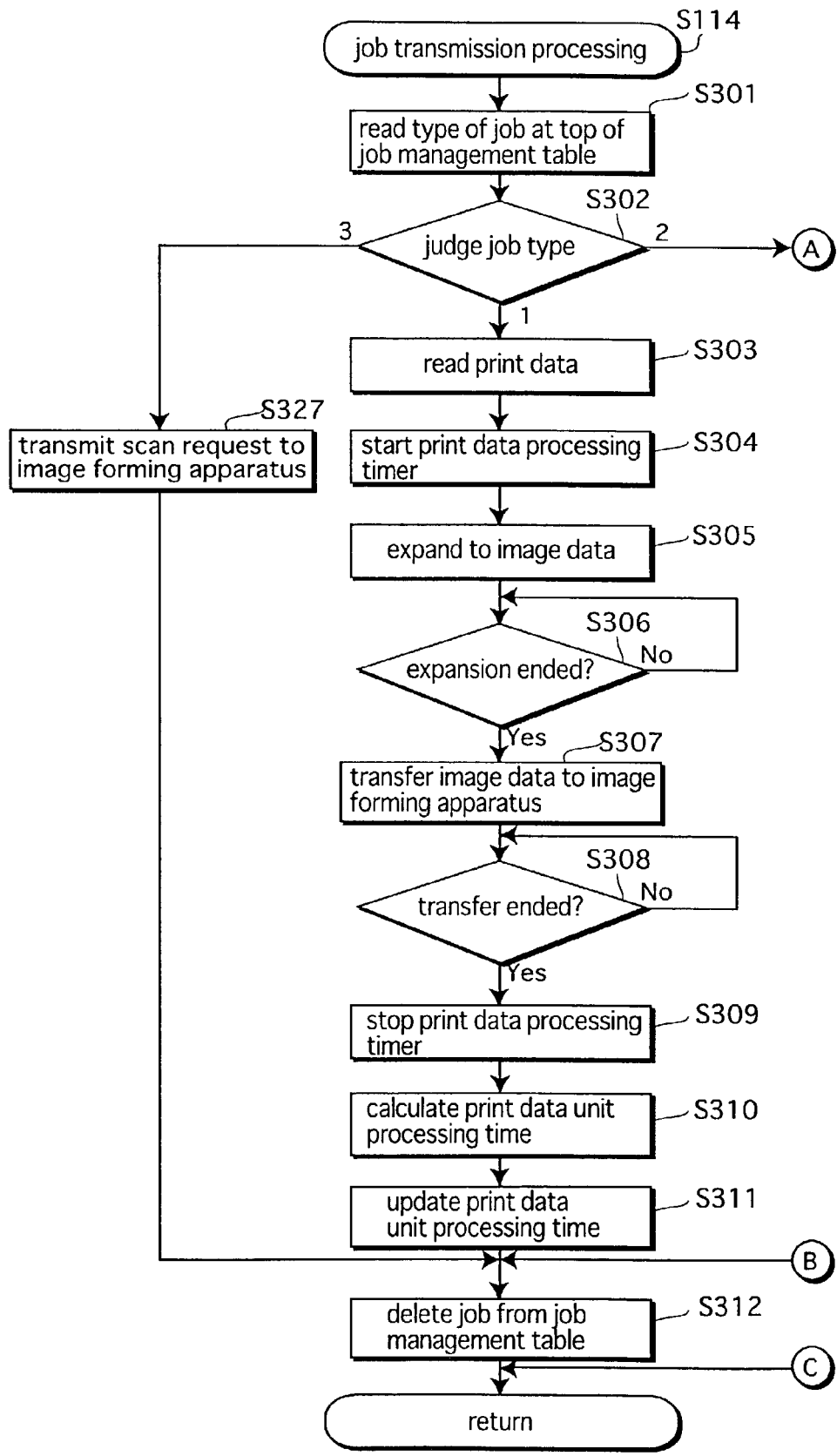
FIG. 22 is a flowchart showing processing executed in the print controller 12 for transmitting an unprocessed job to the image forming apparatus 11, in the third embodiment of the present invention.
Figure 23:
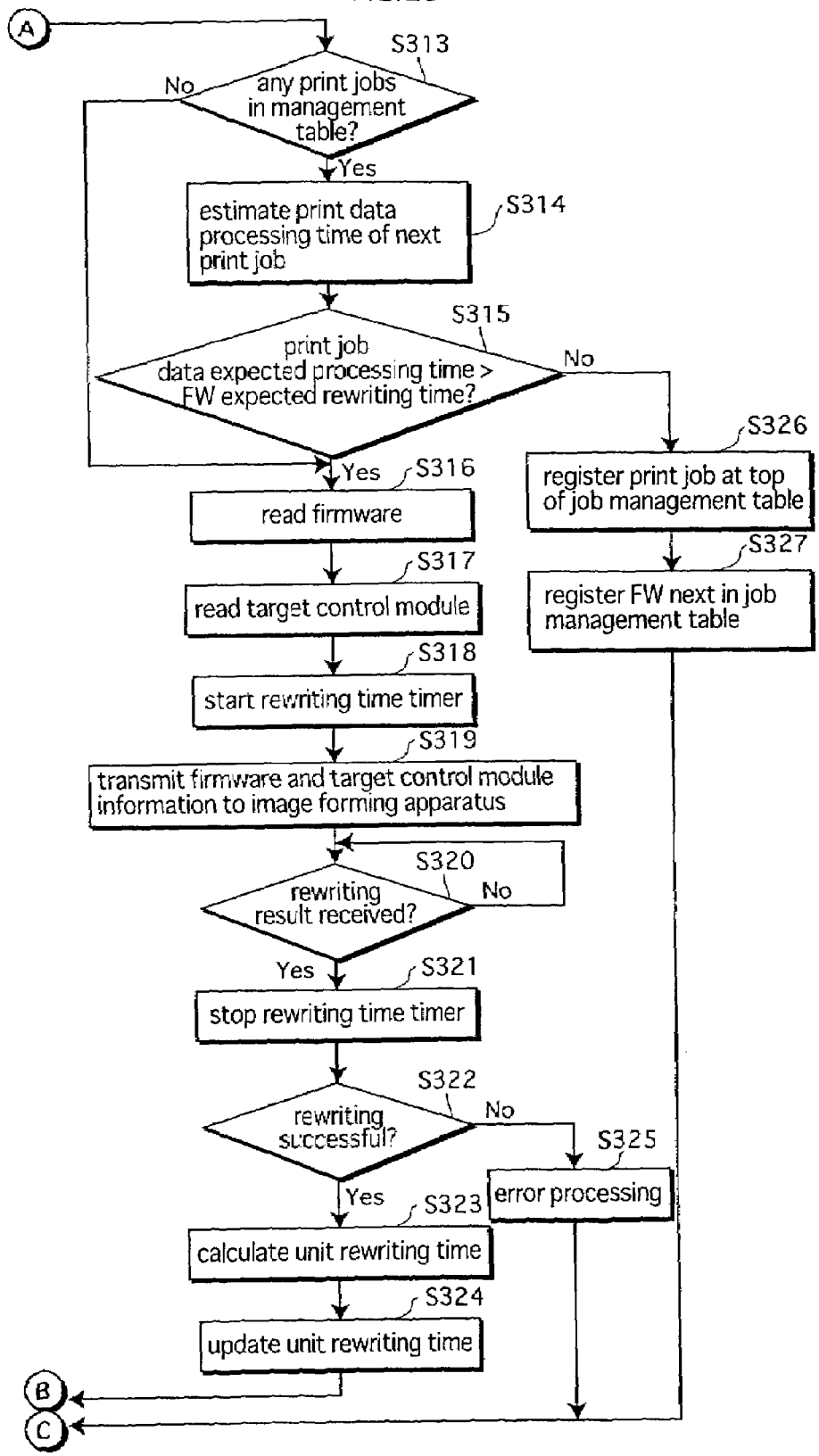
FIG. 23 is a flowchart that is a continuation of the flowchart in FIG. 22.

The following described a third embodiment with reference to FIGS. 21 to 23.

In the third embodiment, the processing for downloading e-mail at step S111 and the content of the job transmission processing at step S114 in FIG. 11 differ to some extent to the second embodiment.

Specifically, in the e-mail downloading processing in the second embodiment, the firmware expected rewriting time is compared with a predetermined time when determining the position in the job management table 211 in which to register the firmware rewriting job (FIG. 17, step S152). However, in the present embodiment, the firmware expected rewriting time is compared to a processing time of the total print data of unprocessed print jobs, to determined the execution order.

In FIG. 21, the CPU 201 first executes processing to download newly received e-mail and so on (steps S121 to S130), then calculates the print data expected processing time and the firmware (FW) expected rewriting time (step S171). Here, the firmware expected rewriting time is found easily, as described earlier, by multiplying the unit rewriting time by the data size of the firmware, and the print data processing time is found by multiplying the unit processing time by the total size of unprocessed print data. The unit rewriting time and the print data unit processing time are found in advance and stored in the NV-RAM 204.

Note that the total data size of unprocessed print jobs is easily obtained by referring to the memory address where each print job remaining in the job management table 211 is stored, and adding together the data size of each print job.

Next, at step S172, the CPU 201 compares the print data expected processing time and the firmware expected rewriting time. When the firmware expected rewriting time is equal to or less than the print data expected processing time, the CPU 201 registers the firmware rewriting job at the top of the job management table 211, to give priority to the firmware rewriting job (step S172, No; step S174). Conversely, when the firmware expected rewriting time is more than the print data expected processing time, the CPU 201 registers the firmware rewriting job at the bottom of the job management table, to give priority to the print jobs (step S172, Yes; step S173).

According to the third embodiment, firmware rewriting demands and print job processing demands can be adjusted even more rationally. In other words, according to the second embodiment, a firmware rewriting job is always registered at the top of job registration table 211 when the firmware expected rewriting time is shorter than a predetermined time. Accordingly, even if the print job expected processing time is a short time such as 5 minutes, the firmware rewriting is executed first even if the firmware expected rewriting time is a little shorter than the predetermined time (here, 10 minutes, for example). In contrast, in the present embodiment print jobs having a short processing time can be executed before the firmware rewriting.

FIGS. 22 and 23 are flowcharts showing the job transmission processing (see FIG. 11, step S114) sub-routine in the print controller 12 in the present embodiment.

First, as shown in FIG. 22, the CPU 201 reads the number of the job type at the top (job number 1) of the job management table 211 (step S301), and distinguishes the job type (step S302). When the job type is "3", the job is a scan job, so the CPU 201 transmits a scan request to the image forming apparatus 11 (step S327). However, when the job type is "1", the job is a print job, so the CPU 201 refers to the memory address of the job in the hard disk drive 205, and reads the print data of the print job from the address in the hard disk drive 205, as well as starting the internal timer in the CPU 201 as a print data processing time timer (step S303, S304). Then, the CPU 201 has the print data expanded into image data in the image expansion unit 208, and when expansion has ended, transfers the image data to the image forming apparatus 11 (step S306, Yes; step S307). The CPU 201 waits for notification that the print job has ended from the image processing apparatus 11 (step S308), and stops the timer on receiving the notification (step S308, Yes; S309). In this way, the CPU 201 is able to obtain the total time from expanding the print data and transferring the image data to the image forming apparatus 11, to printing out. This total time is the print data processing time. The print data unit processing time can be obtained by dividing the print data processing time by the data size of the print job. The value of the unit processing time stored in the NV-RAM 204 is updated to the obtained value of the unit processing time. An even more accurate print data expected processing time can be obtained at step S171 in FIG. 21 based on this updated unit processing time.

At step S302, when the type of the top job in the job management table 211 is "2", in other words when the CPU 201 judges the job to be a firmware rewriting job, the CPU 201 moves to step S313 in FIG. 23, and judges whether there are any print jobs in the job management table 211. If there are any jobs, the CPU 201 calculates the print job expected processing time (step S314), and compares this expected processing time with the firmware expected rewriting time (step S315). Note that it is not necessary to recalculate the firmware rewriting expected time. The value calculated at step S171 in FIG. 21 may be used.

Here, the print data expected processing time is calculated only for the print job next in the order, and is calculated again at step S314 since there are cases in which a new print job is received after the firmware rewriting job is received.

At step S315, when the firmware expected rewriting time is less that the print data expected processing time, the CPU 201, in order to have the firmware rewriting executed, reads firmware from the hard disk drive 205, based on the memory address listed in the job management table 211, as well as reading information (a number from 1 to 4) about the target control module of the firmware from the supplementary information column in the job management table 211 (steps S316 and S317).

Next, the CPU 201 starts its internal timer, as a rewriting time timer (step S318), and transmits the firmware and the target control module information to the image forming apparatus 11 (step S319).

As described in FIGS. 18 and 19 in the second embodiment, after completion of firmware rewriting in any of the control modules, the image forming apparatus 11 notifies the rewriting results to printer controller 12 (see FIG. 18, step S150). At step S320 the CPU 201 waits for notification of the rewriting result from the image forming apparatus 11, and stops the timer on receiving the rewriting results (step S321). Then, the CPU 201 judges from the rewriting results whether rewriting was successful, in the manner described. When rewriting is successful, the CPU 201 divides the time measured by the timer by the data size of the firmware, to calculate the time actually required for rewriting per unit size. The CPU 201 updates the data of the unit rewriting by overwriting the value stored in the NV-RAM 204 with the obtained value (steps S322, S323, S324). In this way the time actually required to rewrite the transmitted firmware is known, and the expected rewriting time can be calculated more accurately at step S171 in FIG. 21.

At step S322 when the CPU 201 judges rewriting to have failed, control is no longer possible according to the firmware, therefore the CPU proceeds to step S325, and after performing error processing to prohibit job processing, display an error message, and so on, returns to the main routine in FIG. 11.

At step S315, when the print data expected processing time is equal to or less than the firmware expected rewriting time, the CPU 201 registers the print job at the top of the job management table 211, to give priority to the print job over the firmware rewriting job, and also registers the firmware rewriting job next (step S326, S327). The CPU 210 then returns to the main routine in FIG. 11.

Note that after making a scan request to the image processing apparatus 211 at step S327, or after transmitting image data to the image processing apparatus 11 at step S311, and when updating of the firmware unit rewriting time at step S324 is complete after firmware rewriting, the CPU 201 moves to step S312, deletes the particular job from the job management table 211, and returns to the main routine in FIG. 11.

As has been described, according to the present embodiment, when registering a received firmware job in the job management table 211, the CPU 201 compares the expected processing time of unprocessed print jobs with the firmware expected rewriting time, and only when the latter is less than the former, registers the firmware rewriting job at the top of the job management table 211. Furthermore, in processing to transmit the firmware job to the image forming apparatus 11, even if the firmware rewriting job is at the top of the job management table 211, the CPU 201 checks whether there are other print jobs, and if so, compares the print job expected processing time for the print job next after the firmware rewriting job with the firmware expected rewriting time, and executes the firmware rewriting job when the firmware expected rewriting time is shorter than the print job expected processing time. Therefore, detailed adjustments can be made when determining the execution schedule of print jobs and firmware rewriting jobs.

Furthermore, according to the present embodiment, even in cases where the sender of the firmware rewriting job and the sender of the image processing job differ, the user who transmitted the image processing job does not need to take the effort to check whether the image processing apparatus has received a firmware rewriting job, or to perform operations to change the order of jobs. Since the execution order of image processing jobs and firmware rewriting jobs is automatically changed based on a result obtained by comparing a firmware expected rewriting time with a total print data processing time for unprocessed print jobs, firmware rewriting demands and the user's print job execution demands can be coordinated rationally without placing a burden on the user, and execution of image processing jobs is not delayed any longer than necessary.

Fourth Embodiment

In the first to the third embodiments the execution schedule is changed without taking into consideration the content and the like of a received firmware rewriting job. However, in the fourth embodiment, it is judged whether the firmware rewriting job is urgent or not, and the schedule changed based on the judgement result.

Figure 24:
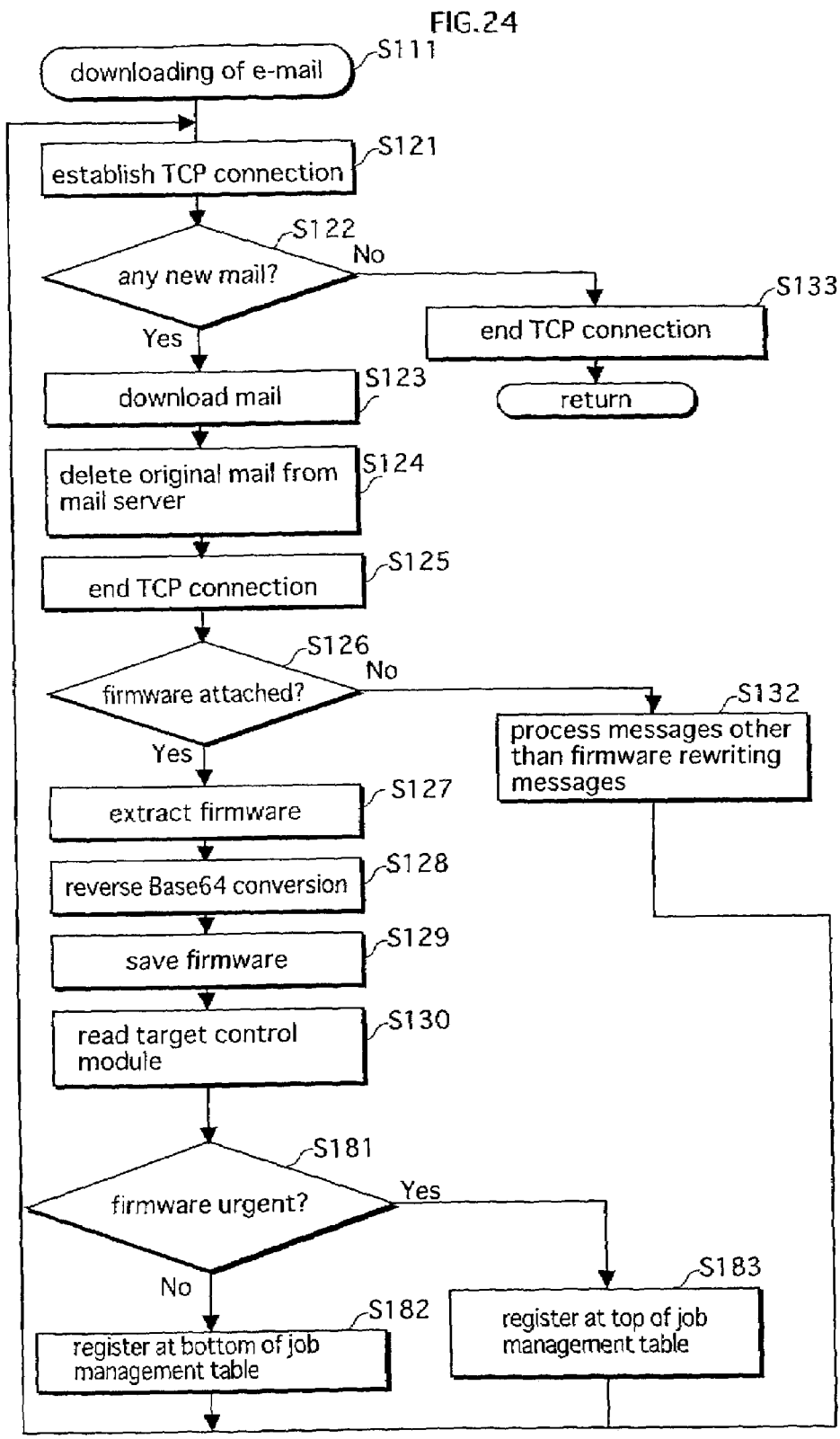
FIG. 24 is a flowchart showing contents of processing in the print controller 12 for downloading e-mail in a fourth embodiment of the present invention.

FIG. 24 is a flowchart showing contents of the e-mail downloading processing (see FIG. 11, step S111) in the printer controller 12 in the present embodiment. The difference between this flowchart and the first embodiment (FIG. 13) is that when registering a rewriting job for firmware that is attached to e-mail in the job management table 211, it is judged whether the firmware is urgent (step S181).

When it is judged at the service center 9 that a firmware rewriting job should be executed with priority over print jobs, the service center 9 transmits e-mail to which the firmware is attached with an identifier in the header section showing that the firmware rewriting job has priority over print jobs, to the printer controller 12. A firmware rewriting job may be given priority, for example, when there is a possibility that a major defect in the current firmware could cause a problem, such as the driving system in the image forming apparatus not being able to be controlled smoothly, or when the quality of reproduced images is deteriorating remarkably due to inappropriateness of correction parameters in the image quality correction control unit 146.

Figure 25:
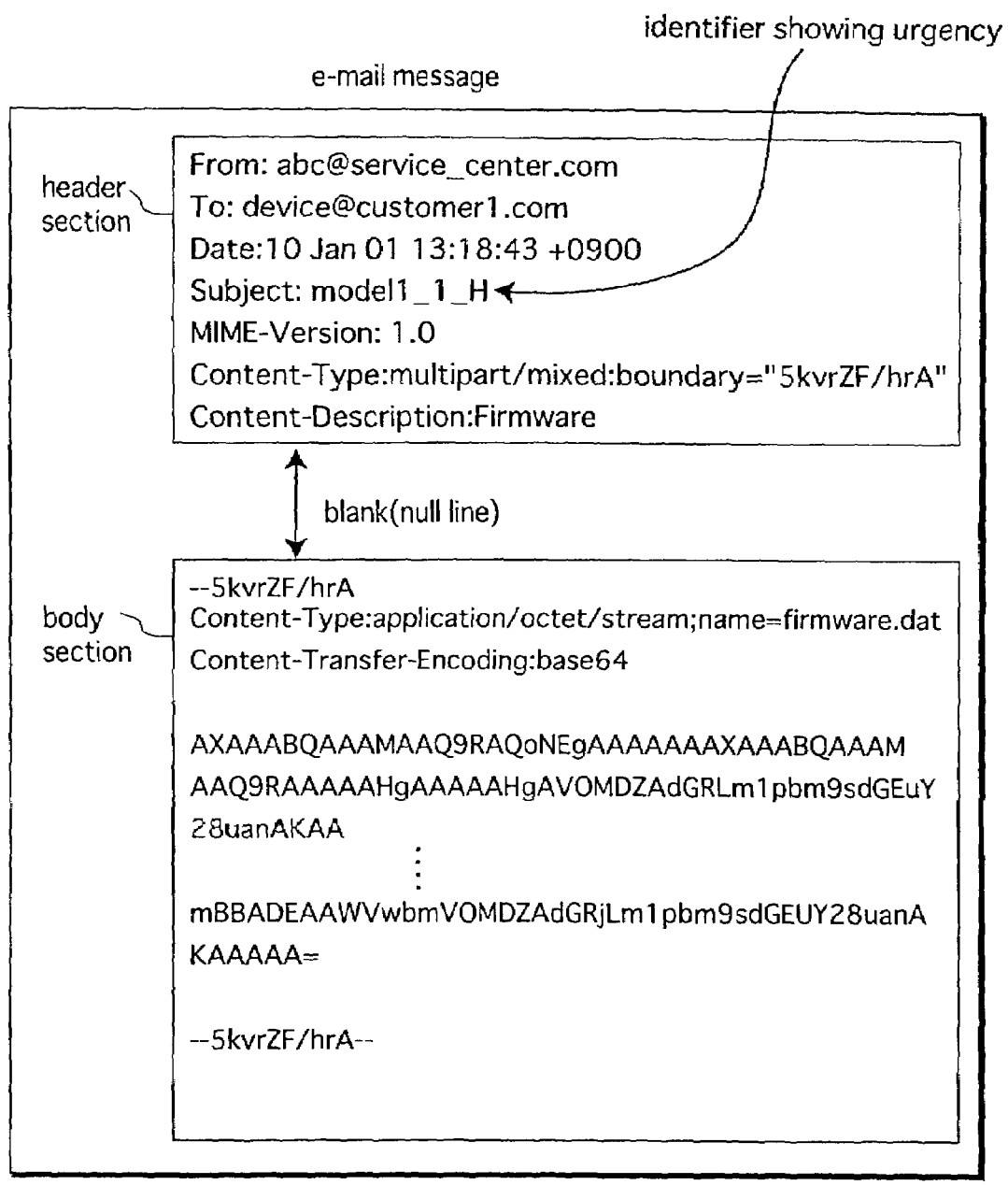
FIG. 25 shows an example of a message of an e-mail to which firmware is attached, in the fourth embodiment of the present invention.

FIG. 25 shows the content of one example of such a described e-mail. An "H" ("hurry") is added to the end of the contents of the Subject field, as an identifier showing that the firmware is urgent. Conversely, when firmware is not urgent, the e-mail is transmitted with an "S" ("slow") added to the end of the contents of the Subject field.

At step S181, the CPU 201 finds whether the identifier in the header section of the received e-mail is an H or an S, to judge whether the firmware is urgent or not.

When the CPU 201 judges that the firmware is urgent, it registers the rewriting job at the top of the job management table 211 (step S183). When the CPU 201 judges that the firmware is not urgent, it registers the rewriting job at the bottom of the job management table 211 (step S182). After either step S183 or step S182, the CPU 201 returns to the main routine in FIG. 11.

In this way urgent firmware rewriting jobs can be executed with priority, and print jobs are not executed while there is a defect in the control program or the like of the image processing apparatus. Therefore, various problems can be resolved, and the wishes of the user who executes print jobs can be gratified.

In particular, according to the present embodiment, even in cases where the sender of the firmware rewriting job and the sender of the image processing job differ, the user who transmitted the image processing job does not need to take the effort to check whether a firmware rewriting job received by the image processing apparatus is urgent, or to perform operations to change the order of jobs. Since the execution order of image processing jobs and firmware rewriting jobs is automatically changed based on a result obtained by judging whether the firmware rewriting job is urgent, firmware rewriting demands and the user's print job execution demands can be coordinated rationally without placing a burden on the user.

Fifth Embodiment

In the first to the fourth embodiments, the execution schedule for firmware rewriting jobs and image processing jobs is automatically changed in the printer controller 12 based on a set reference, however the fifth embodiment differs in that when the printer controller 12 receives a firmware rewriting job, it makes an inquiry to the user who transmitted the print job as to whether the firmware rewriting job can be executed with priority over the print job.

Figure 26:
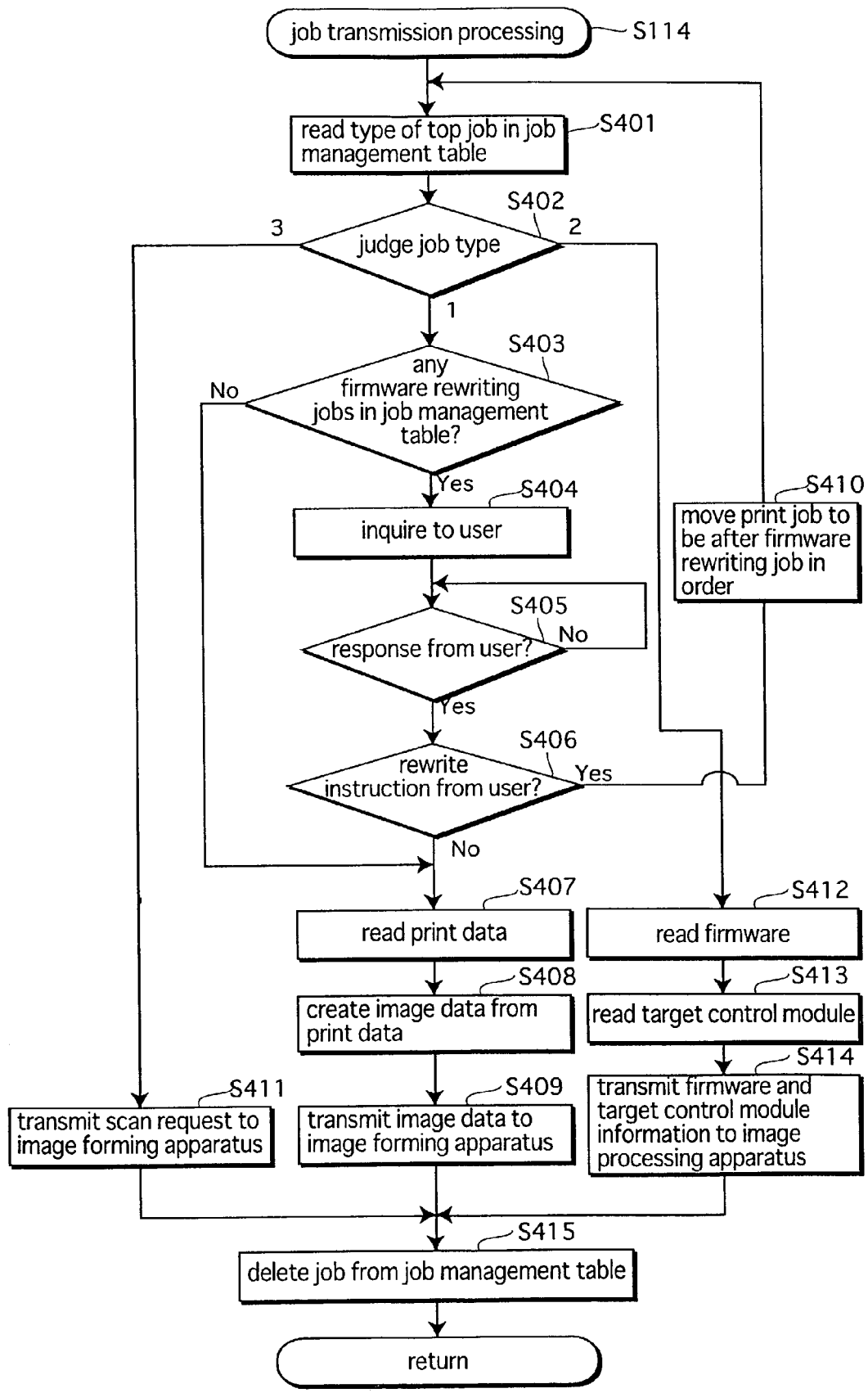
FIG. 26 is a flowchart showing processing executed in the print controller 12 for transmitting an unprocessed job to the image forming apparatus 11, in a fifth embodiment of the present invention.

FIG. 26 is a flowchart showing the contents of a job transmission processing (FIG. 11, step S114) sub-routine executed in the print controller 12 in the present embodiment.

As the drawing shows, the CPU 201 first reads the type of the job at the top of the job management table 211 (step S401), and distinguishes the job type (step S402).

When the job type is "3", the job is a scan request, so the CPU 201 transmits the scan request to the image forming apparatus (step S411). When the job type is "1", the CPU 201 judges whether there are any firmware rewriting jobs registered lower in the job management table 211 (step S403), and makes an inquiry to the user about whether to give priority to the user's print job or the firmware rewriting job (step S404).

The IP addresses of the destination and the sender of a print job received through the LAN are included in the header section of the print job data, and accordingly, the CPU 201 transmits the inquiry to the IP address of the sender. Note that, although not illustrated, the IP address of the sender read when the print job is received, and written in the supplementary information column for the print job in the job management table 211. The CPU 201 refers to the job management table 211 to obtain the IP address of the sender.

CPU 201 waits for a response to the inquiry from the user (step S405), and when there is a response that the user does not wish to give priority to the firmware rewriting job (step S406, No), the CPU 201, giving priority to the print job, reads the print data of the print job from the hard disk drive 205, and after having the print data expanded into image data, transmits the image data to the image forming apparatus (steps S407, S408, and S409).

At step S406, when the response is that the user does wish to give priority to the firmware rewriting job, the CPU 201 moves to step S410 and moves the registered print job to be below the firmware rewriting job in the job management table 211 (step S410), and returns to step S401. Here, the CPU 201 once again reads the type of the top job in the job management table 211. When the CPU 201 judges the job type to be "1", it judges whether any firmware rewriting jobs are registered below (step S403), and if so, makes an inquiry to the transmitter about whether to execute the print job (step S404). Depending on the result of the response, the CPU 201 either executes the print job, or returns to step S401, and repeats the loop from step S401 to S406 and step S410 (hereinafter "inquiry loop").

For example, in a case where in the job management table 211 the first and second jobs are print jobs and the third job is a firmware rewriting job, and the users that transmitted the first and second jobs both respond that they wish to give priority to the firmware rewriting job, the inquiry loop is executed twice, and step S410 is passed through twice.

Therefore, the firmware rewriting job is moved to the top of the job management table. Consequently, next time at step S402, the CPU 201 judges the type of the job to be "2", quits the inquiry loop, and moves to step S412. At step S412 the CPU 201 reads the firmware from the hard disk drive 205, and reads the target control module information (a number from 1 to 4) from the supplementary information column in the job management table 211 (step S413). The CPU 201 then transmits the firmware and the target control module information to the image processing apparatus 11 (steps S414). The image processing apparatus 11 receives the firmware and the target control module information, and executes the firmware rewriting processing in FIG. 16.

After completing any of steps S411, S409, and S414, as described the CPU 201 deletes the job that was transmitted to the image processing apparatus 11 from the job management table 211 (step S415), and returns to the main routine in FIG. 11.

When the user receives the inquiry and is in a hurry for his/her print job, it is likely that the user will refuse the firmware rewriting job to be executed with priority. Furthermore, when the user is not in a hurry for his/her print job, and the user wishes to have the print job printed in an optimal state after the firmware is rewritten, the user is likely to send a response approving the firmware being executed with priority.

In this way, by inquiring to the user who transmitted the print job about whether to give priority to the print job or the firmware rewriting job, a schedule for job processing can be determined with importance placed on the will of the user.

Note that at steps S106 to S108 in FIG. 11, the CPU 201 automatically reorders to give print jobs priority over firmware rewriting jobs, even when print job is received after a firmware rewriting job, therefore the inquiry is made to the user who transmitted the print job. Furthermore, it is possible that cases may arise in which a user who transmitted a print job is not near the client terminal or has ended the connection with the image processing apparatus 1, even when a firmware rewriting job is received after a print job is received. In such cases, job transmission processing is halted because the user's response cannot be obtained at step S405. To solve this problem, it is possible to have the CPU 201 automatically proceed to step S407 and execute the print job when a response is not obtained after waiting a predetermined length of time (for example, 1 minute).

Furthermore, in the present embodiment, when the job is a scan job, the CPU 201 does not inquire to the sender of the scan job about whether to give priority to the rewriting job. This is because a scan job is usually executed in a short amount of time, and therefore there is usually no problem in giving the scan job priority over the firmware rewriting job. However, it is possible to have the CPU 201 inquire to the sender of a scan job.

As has been described, even in cases where the sender of the firmware rewriting job and the sender of the image processing job differ, an inquiry is made about whether a received firmware job is to be given priority. Since the execution order of image processing jobs and firmware rewriting jobs is automatically changed based on the response, the user who transmitted the image processing job does not have to make the effort to check whether there is a firmware rewriting job for the image processing apparatus, and job management can be executed sufficiently reflecting the user's wishes.

Sixth Embodiment

The sixth embodiment is something like a combination of the fourth and fifth embodiments.

Specifically, firmware rewriting jobs are given a degree of urgency, and the most urgent firmware rewriting jobs are executed with priority, while an instruction is sought from the user about execution of those that are less urgent, and when there is no instruction from the user after a predetermined length of time has passed, the rewriting job executed.

The following describes the control contents particular to the present embodiment, based on FIGS. 27 to 32.

Figure 27:
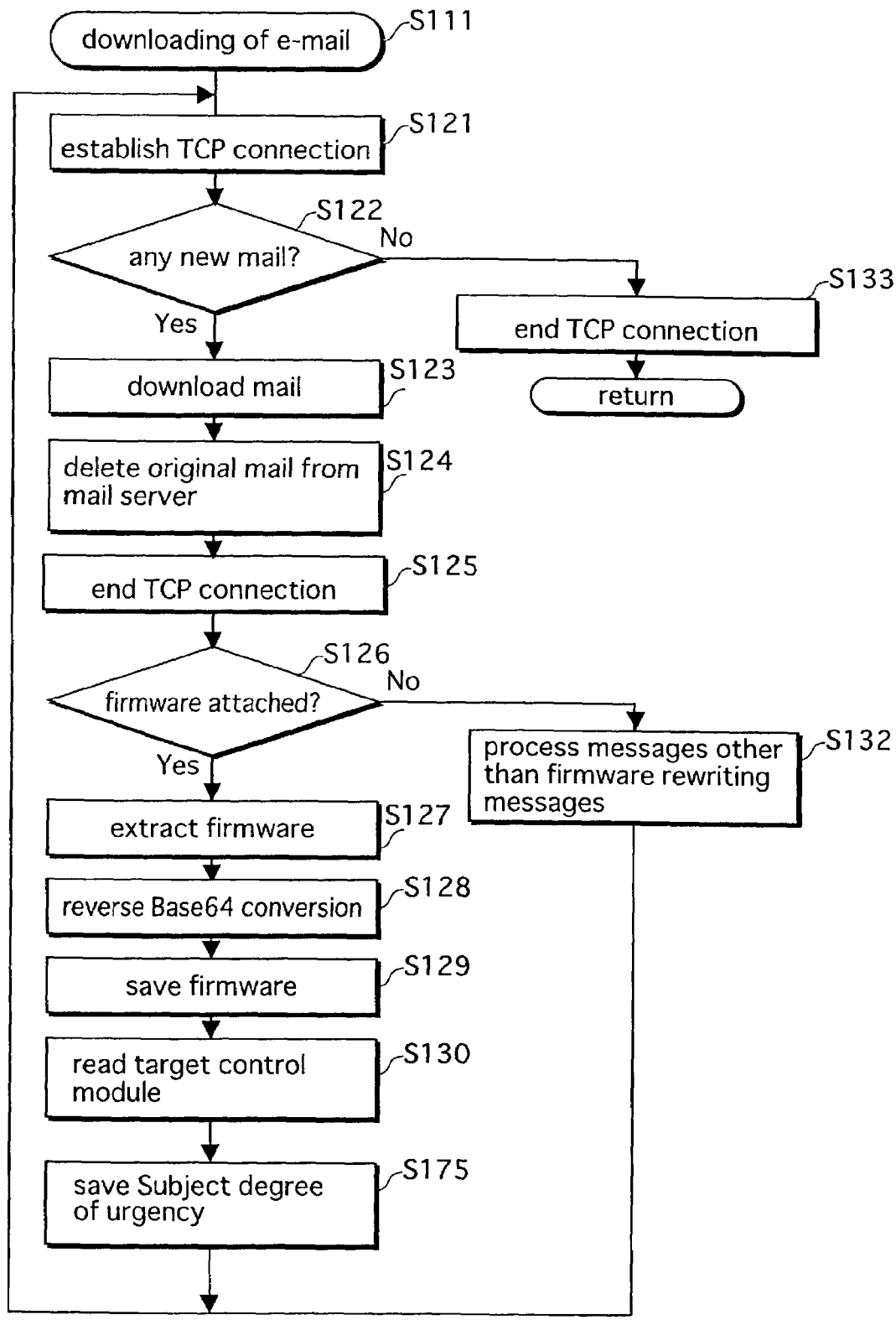
FIG. 27 is a flowchart showing contents of processing in the print controller 12 for downloading e-mail in a sixth embodiment of the present invention.

FIG. 27 is a flowchart showing the e-mail downloading processing (see FIG. 11, step S111) sub-routine performed by the printer controller 12 in the present embodiment.

In the corresponding flowchart (FIG. 13) in the first embodiment, the CPU 201 saves the firmware, and reads the target control module (steps S129, S130) before registering the firmware rewriting job at the bottom of the job management table 211. However, in the present embodiment, as shown by step S175 in FIG. 27, the CPU 201 stores the degree of urgency, which is listed in the Subject in the header section of e-mail to which firmware is attached, separately to a rewriting job management table 212 (see FIG. 29).

Figure 28:
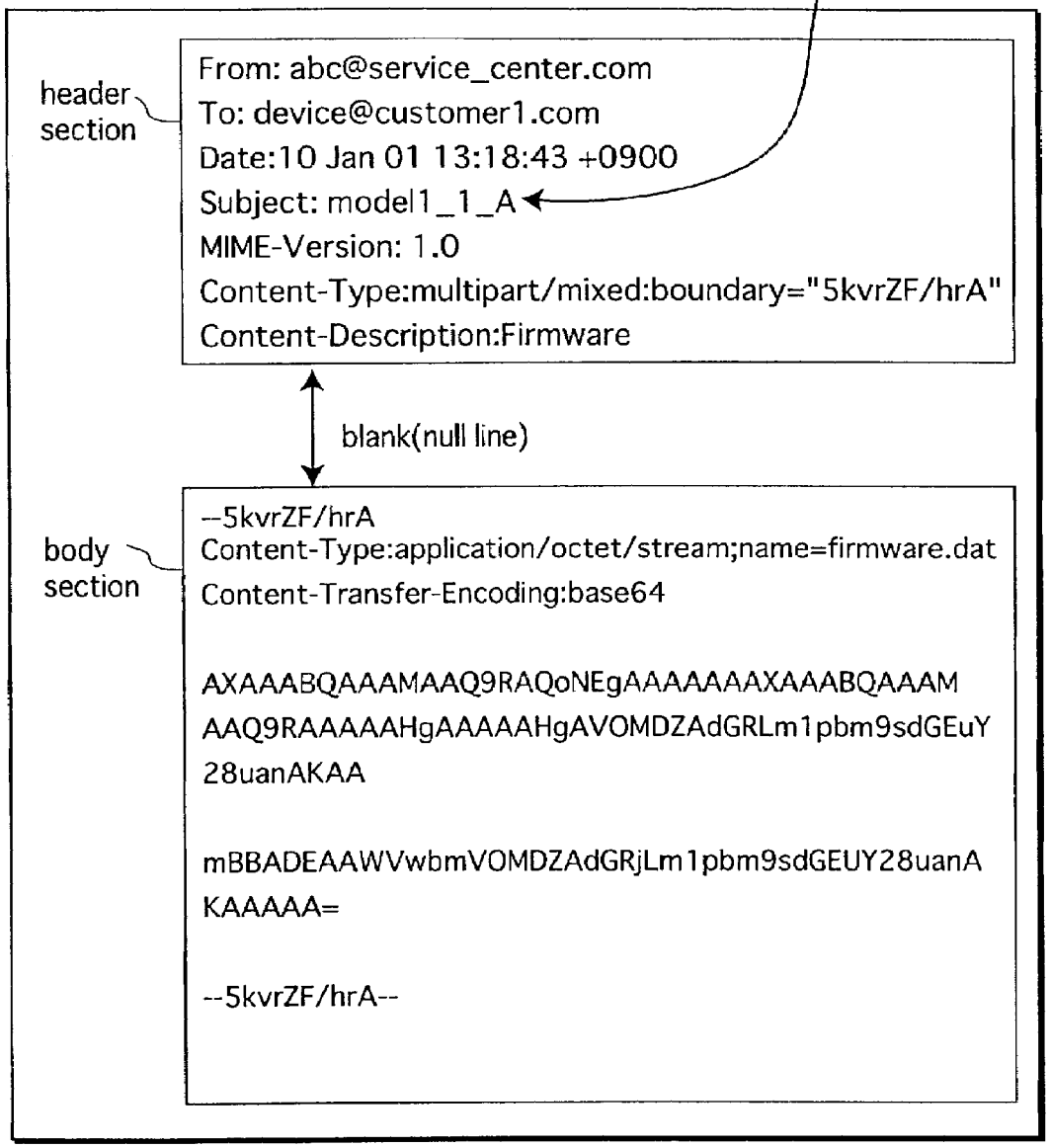
FIG. 28 shows an example of a message of an e-mail to which firmware is attached, in the sixth embodiment of the present invention.

In the present embodiment there are three degrees of urgency: A, B, and C. Either A, B, or C is attached to e-mail by the service center at transmission, according to the degree of urgency of the rewriting. FIG. 28 shows an example of such e-mail. Here, an "A" is added to the contents of the Subject field with an under bar "_".

Figure 29:
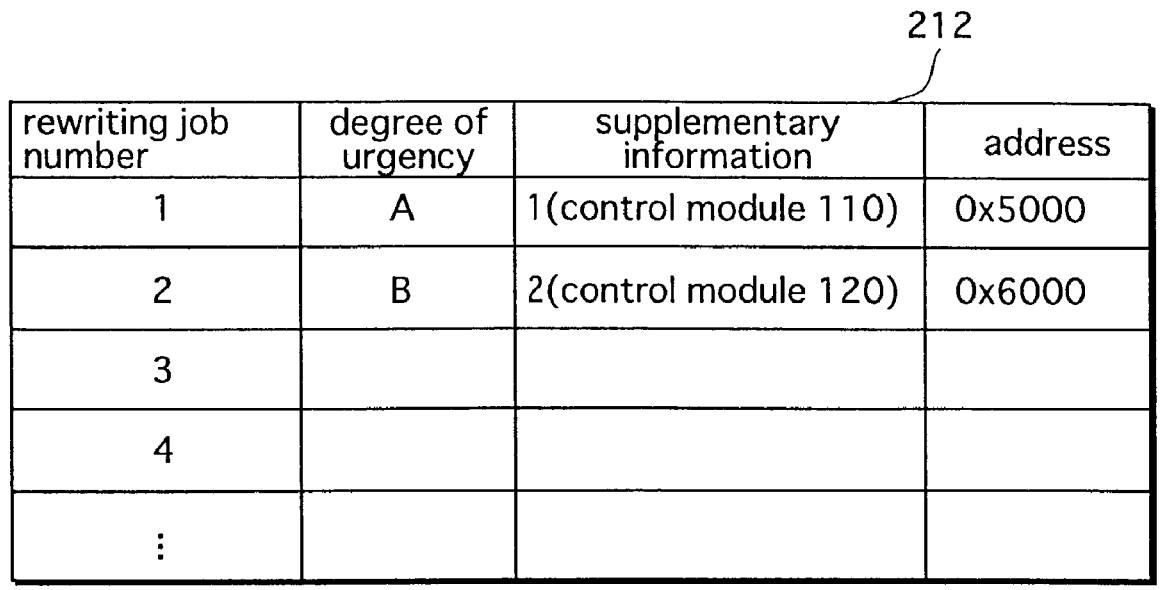
FIG. 29 shows a rewriting job management table for registering firmware rewriting jobs, in the sixth embodiment of the present invention.

FIG. 29 shows an example of the rewriting job management table 212 for registering the degree of urgency. This rewriting job table 212 is stored in the NV-RAM 204. A rewriting job number column shows the order in which firmware rewriting jobs are received. The degree of urgency (A to C) of the firmware rewriting is stored in a degree of urgency column. The control module whose firmware is the target of rewriting is stored in a supplementary information column. A memory address showing the storage position of the firmware in the hard disk drive 205 is stored in an address column.

Note that an example of a degree of emergency A is when there is a defect in the control program for the sheet conveying system in the image forming apparatus, and the apparatus would break down if the defect is ignored. An example of a degree of emergency B is rewriting of, for example, control parameters of the data conversion (gamma coefficient etc.), or control parameters of the image processing series (transfer voltage, electrical charge voltage, etc.), for maintaining image quality of reproduction images. An example of a degree of emergency C is rewriting for changing or adding a copy function.

Figure 31:
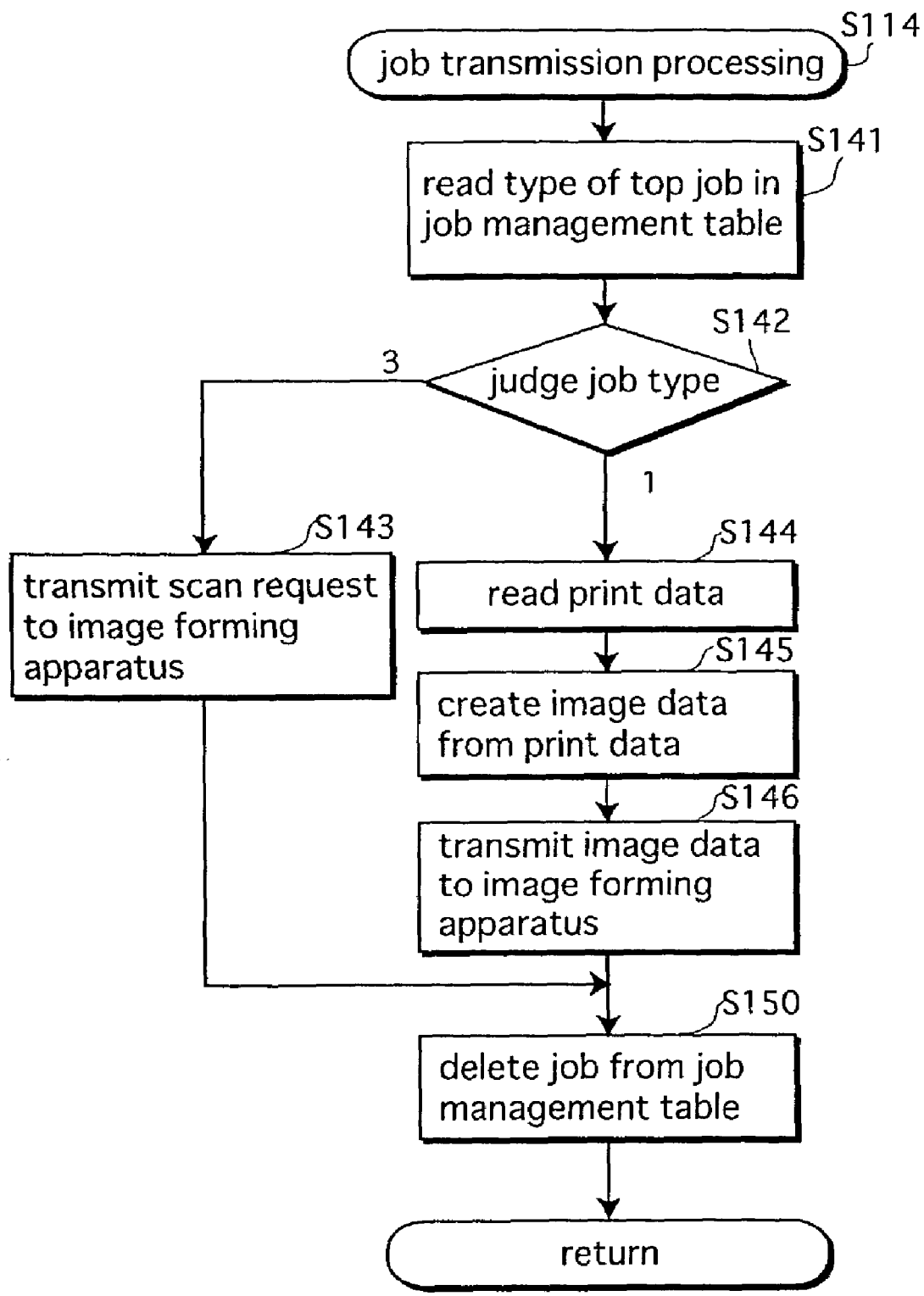
FIG. 31 is a flowchart showing processing executed in the print controller 12 for transmitting an unprocessed job to the image forming apparatus 11, in the sixth embodiment of the present invention.

FIG. 31 is a flowchart showing the job transmission processing (see FIG. 11, step S114) sub-routine executed in the printer controller 12 in the present embodiment.

Unlike the job transmission processing in the first embodiment shown in FIG. 14, at step S142, when the job type registered at the top of the job management table 211 is "2", in other words in the case of a firmware rewriting job, the CPU 201 does not distinguish the type of the job, and does not perform processing to transmit the firmware rewriting job to the image forming apparatus 11. Other than this point, the processing is the same as that in FIG. 13, and the CPU 201 transmits a scan request or image data to the image forming apparatus according to whether the job type is "3" or "1".

The reason the judgment of the job type 2 is not performed in the present embodiment is that the execution schedules of image processing jobs (print jobs and scan jobs) and firmware rewriting jobs are not managed collectively in the same job management table 211. The timing of execution of firmware rewriting jobs is determined according to the following firmware rewriting timing processing.

Figure 32:
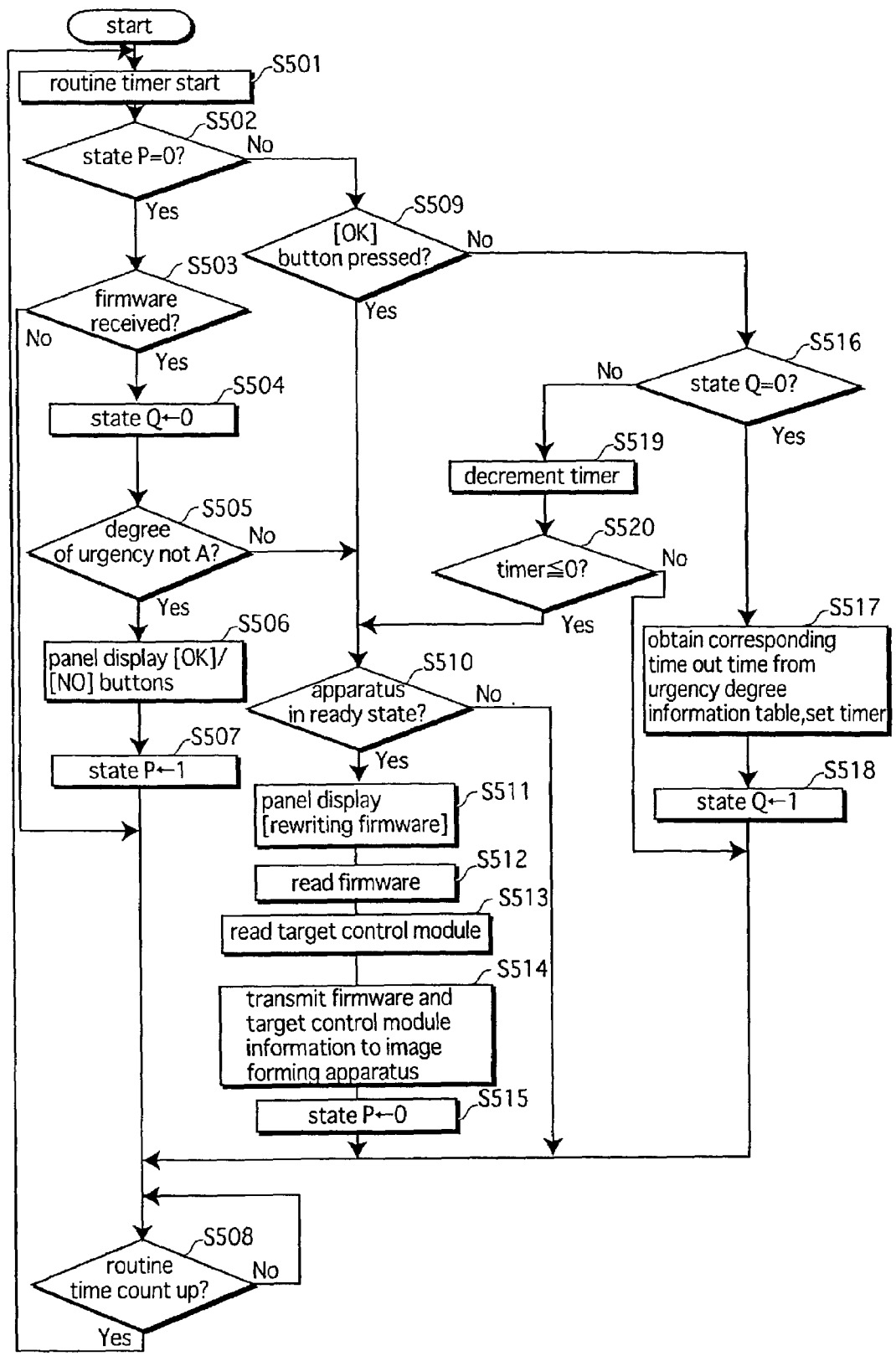
FIG. 32 is a flowchart showing firmware rewriting timing processing executed by the print controller 12 in the sixth embodiment of the present invention.

FIG. 32 is a flowchart showing the contents of firmware rewriting timing processing in the printer controller 12, which is executed in parallel with the main routine in FIG. 11.

First, the CPU 201 starts its internal timer for managing the following routine processing time, as a routine timer (step S501). Then, the CPU 201 judges whether a state P is "0" (step S502). This state P, and a state Q that is described later are flags that are set in the S-RAM 203.

At step S502, when it is judged that the state P is "0", the CPU 201 refers to the rewriting job management table 212 to judge whether a firmware rewriting job has been received (step S503) When a firmware rewriting job has been received, the CPU 201 sets the state Q to "0" (step S504), and refers to the rewriting job management table 212 to judge whether the degree of urgency of the job is "A" or not (step S505).

Here, when the degree of urgency is "A", since it is necessary to rewrite the firmware straight away, the CPU 201 proceeds to step S510, checks whether the image forming apparatus 11 is in a ready state or not, and if so, instructs the control unit 100 of the image processing apparatus 11 to have "rewriting firmware" displayed on the display unit of the operation panel 119 (step S511). Then the CPU 201 reads the firmware data from the hard disk drive 205 as well as reading the target control module from the rewriting job management table 212 (steps S512, S513), and transmits data of the firmware and the target control module to the image forming apparatus 11 (step S514). Next, the CPU 201 sets the state P to "0" (step S515), proceeds to step S508 and waits for the routine timer to end, and returns to step S501.

On the other hand, at step S505, when the degree of urgency of the received firmware rewriting job is not "A", in other words when the degree of urgency is "B" or "C", the CPU 201 instructs CPU 111 of the image forming apparatus 11 to have a message such as "Firmware rewriting request received from service center. Degree of urgency B (or C). Do you wish to give priority to rewriting of firmware?", and an "OK" button and a "NO" button displayed for the response on the display unit 119 (step S506). In this way, the wishes of the user are reflected in the execution schedule for firmware rewriting jobs that have a low degree of urgency. Note that a clear touch panel is laminated on the surface of the LCD plate of the display unit, and the user is able to input a response by pressing the surface of the relevant display button.

Next, the CPU 201 sets the state P to "1" (step S507), and when the routine time reaches a predetermined time (step S508, Yes), the CPU 201 returns to step S501, and proceeds to step S502, but since the state P is "1", the CPU 201 judges "No". Consequently, the CPU 201 proceeds to step S509, and judges whether the "OK" button has been pressed.

When the "OK" button has been pressed, the CPU 201 executes step S510 to S515 (described later), and transmits the firmware rewriting job to the image forming apparatus 11.

At step S509, when the CPU 201 judges that the "OK" button has not been pressed, it proceeds to step S516, judges whether the state Q is "0", and if so, sets its internal timer to time out after a time that is determined in advance according to the degree of urgency (step S517). Then, the CPU 201 sets the state Q to "1", and returns to step S508.

Figure 30:
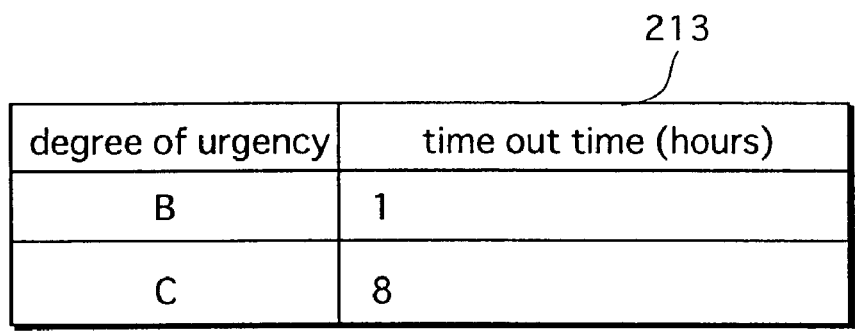
FIG. 30 shows an example of an urgency information table in the sixth embodiment of the present invention.

The time out time corresponding to the degree of urgency is stored in advance in an urgency degree information table. FIG. 30 shows an example of the urgency degree information table. A time out time of one hour is set for degree of urgency B, and a time out time of eight hours is set for degree of urgency C. Note that it is not necessary to the register degree of urgency A in this table since firmware rewriting jobs having a degree of urgency A are executed straight away. This table is stored in either the EP-ROM 202 or the NV-RAM 204. Note that although here the time out time for the degrees of urgency B and C are set at one hour and eight hours respectively, it is extremely convenient if the timeout times are able to be changed arbitrarily from the operation panel 209 according to the usage situation in the particular work place in which the image forming apparatus 11 is placed.

Next, the CPU 201 goes through the routine and arrives at step S516. Here, the state Q is "1", therefore the CPU 201 proceeds to step S518, decrements the timer by the counter time, and judges whether the timer is equal to or less than 0 (step S520). When the timer is not equal to or less than 0, the CPU 201 goes through the routine until the timer does become equal to or less than 0, and then executes the firmware rewriting job transmission processing at steps S510 to S515.

Note that the "OK" and "NO" buttons are displayed on the operation panel 209 for a predetermined length of time (for example, five minutes). When the "OK" button is pressed before the timer becomes equal to or less than "0", the CPU 201 executes the firmware rewriting job transmission processing. Furthermore, when the "OK" and "NO" buttons are no longer displayed on the operation panel 209 after a predetermined length of time, the result of the judgement at step S509 is "No".

In this way, in the present embodiment, firmware rewriting jobs are given a degree of urgency, and rewriting jobs for firmware such as that for preventing problems such as a breakdown of the apparatus are executed without making an inquiry to the user, and with priority over other jobs. For jobs that have a lower degree of urgency, instruction from the user is prompted on the operation panel, and when there is no response from the user, or when the user does not allow the rewriting to have priority, the rewriting job is executed after a time out time that is set according to the degree of urgency has passed. Therefore, the execution schedule of firmware rewriting jobs and print jobs can be determined extremely rationally.

Note that although in the present embodiment an inquiry is made to the user on the operation panel 209 about whether to execute a firmware rewriting job when the job is not of the degree of urgency A, another possible structure is one such as that in the fifth embodiment in which an inquiry message is transmitted via the LAN directly to the client terminal, and the response is made at the client terminal.

As has been described, according to the present embodiment, even in cases where the sender of the firmware rewriting job and the sender of the image processing job differ, the degree of urgency of the firmware rewriting job received by the image forming apparatus can be judged without requiring the user to go to the trouble to confirming the degree of urgency and having to perform operations to change the order of jobs. Furthermore, priority is given to firmware rewriting jobs that have the highest degree of urgency, and the user's wishes are confirmed for jobs that have a lower degree of urgency. Therefore, job management can be executed rationally coordinating firmware rewriting demands and print job execution demands without placing a burden on the user.

Note that although in the present embodiment only firmware rewriting jobs that have the highest degree of urgency are executed with priority over image processing jobs without making an inquiry to the user, it is possible to have a structure in which there is a larger number of degrees of urgency, an firmware with a predetermined degree or higher (for example the first and second degrees) are processed with priority and without inquiring.

Modifications

The present invention is not limited to the above-described embodiments. The following describes examples of possible modifications.

(1) In the embodiments, print jobs and scan jobs are used as examples for image processing jobs received from the client terminals, however, image processing jobs may also include copy jobs and so on.

(2) In the above-described embodiments, firmware is shown as the activation programs and the like in each control module in the image processing apparatus 1. However, firmware may refer collectively to, for example, types of programs and data that are not modified dynamically by a computer during computing processing, or that are programs and data that are not changed by the user. For example, activation programs and input/output programs such as an OS (operating system), an interpreter, a compiler, and BIOS.

(3) In the embodiments the image forming apparatus 11 and the printer controller 12 are separate apparatuses, however the printer controller 12 may be internalized in the image forming apparatus 11. Furthermore, the image processing apparatus of the present invention is not limited to the example of an MFP. The present invention may be applied to any general image processing apparatus comprising an image forming apparatus, such as a printer, a scanner and a facsimile, and a print controller that is connected to and manages the image processing apparatus.

(4) The present invention is described in the above-described embodiments as being applied to an image processing apparatus, but is not limited to being so. The present invention may be a program for determining the execution schedule of firmware rewriting jobs and image processing jobs. Furthermore, the present invention may be the program recorded on a computer readable recording medium such as a flexible disk, a hard disk, a CD-ROM, an MO, a DVD, a DVD-ROM, a DVD-RAM and a semiconductor memory.

Furthermore, the program may, for example, be a management program that manages jobs to be executed in an image processing apparatus, the program having executed in a computer: a first reception step of receiving an image processing job from a first sender; a second reception step of receiving a firmware rewriting job from a second sender; and a modifying step for modifying the execution schedule of the image processing job and the firmware rewriting job.

(5) The technical concept of the image processing apparatus of the fifth embodiment is not to modify a temporarily set execution schedule based on the response from the user, but to wait for the response from the user, and then determined the execution schedule. In this case, the image processing apparatus of the fifth embodiment can be considered to be an image processing apparatus including storage means for storing firmware; first reception means for receiving an image processing job from a first sender; image processing job executions means for executing the image processing job, with use of the firmware stored in the firmware storage means; second reception means for receiving a firmware rewriting job; firmware rewriting means for rewriting the firmware stored in the firmware storage means by executing the firmware rewriting job; inquiry means for, when second reception means receives the firmware rewriting job the second sender, making an inquiry to the first sender about the execution schedule of the image processing job and the firmware rewriting job; response reception means for receiving a response to the inquiry, from the first sender; and job management means for determining the execution schedule of the image processing job and the firmware rewriting job, based on the response received by the response reception means.

(6) Note that the embodiments describe a method for managing jobs by a management unit (printer controller) that is directly connected to each image processing apparatus, however, for example, job management may be performed by a server connected to an image processing apparatus (or image forming apparatus) via a LAN. Furthermore, instead of one server for each image processing apparatus, it is possible to have the server successively execute job management for each of a plurality of image processing apparatuses. In this case, the server instructs each image processing apparatus to rewrite a job management table held by the image processing apparatus. Specifically, the server instructs the image processing apparatus to rewrite the job management table so that image processing jobs are performed before a firmware rewriting job, or the server may execute control operations such as for judging the relative size of a firmware expected rewriting time and a image processing job expected processing time, or for judging the degree of urgency of a firmware rewriting job, and set the execution order based on the result of the judgement.

(7) Furthermore, the present invention also applies to an individual management unit (printer controller) for managing an image forming apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present inventions, they should be construed as being included therein.

What is claimed is:

1. The image processing apparatus comprising:
a firmware storage unit that stores firmware;
   a first reception unit that receives an image processing job from a first sender;
   an image processing job execution unit that executes the image processing job with use of the firmware;
   a second reception unit that receives a firmware rewriting job from a second sender;
   a firmware rewriting unit that rewrites the firmware by executing the received firmware rewriting job;
   a modifying unit that modifies an execution schedule of the received image processing job and the received firmware rewriting job;
   an inquiry unit that, when the second reception unit receives the firmware rewriting job, makes an inquiry to the first sender about an order of priority of the image processing job and the firmware rewriting job; and
   a response reception unit that receives a response to the inquiry, from the first sender,
   wherein the modification unit modifies the execution schedule, according to the received response.

2. The image processing apparatus comprising:
a firmware storage unit that stores firmware;
   a first reception unit that receives an image processing job from a first sender;
   an image processing job execution unit that executes the image processing job with use of the firmware;
   a second reception unit that receives a firmware rewriting job from a second sender;
   a firmware rewriting unit that rewrites the firmware by executing the received firmware rewriting job;
   a modifying unit that modifies an execution schedule of the received image processing job and the received firmware rewriting job;
   an urgency degree judgment unit that judges a degree of urgency of the firmware rewriting job;
   an inquiry unit that, when the degree of urgency is lower than a predetermined degree, makes an inquiry to the first sender about an order of priority of the image processing job and the firmware rewriting job; and
   a response reception unit that receives a response to the inquiry, from the first sender,
   wherein the modifying unit, when the degree of urgency is equal to or higher than the predetermined degree, modifies the execution schedule so that the firmware rewriting job is executed with priority over the image processing job, and, when the degree of urgency is lower than the predetermined degree, modifies the execution schedule according to the response.

3. The image processing apparatus of claim 2, further comprising:
   a timer unit that, when the degree of urgency is judged to be lower than the predetermined degree, starts a timer,
   wherein the modifying unit, when a predetermined length of time has been timed by the timer unit, and even if a response is not received instructing that the firmware rewriting job is to be executed with priority over the image processing job, modifies the execution schedule so that the firmware rewriting job is executed with priority over the image processing job.

4. The image processing apparatus comprising:
a firmware storage unit that stores firmware;
   a first reception unit that receives an image processing job from a first sender;
   a second reception unit that receives a firmware rewriting job from a second sender;
   a job management table in which the received image processing job and the received firmware rewriting job are registered;
   an image processing job execution unit that executes the image processing job with use of the firmware;
   a firmware rewriting unit that rewrites the firmware by executing the received firmware rewriting job;
   a modifying unit that, when one of the first reception unit and the second reception unit receives a job, modifies an order of jobs registered in the job management table;
   an instruction unit for instructing the image processing job execution unit and the firmware rewriting unit to respectively execute the jobs in the order in which the jobs are registered in the job management table; and
   an inquiry unit that, when the second receiving unit receives the firmware rewriting job from the second sender, makes an inquiry to the first sender about an order of priority of the image processing job and the firmware rewriting job; and a response reception unit that receives a response to the inquiry, from the first sender, wherein the modification unit modifies the order in the job management table according to the response.

5. The image processing apparatus comprising:

a firmware storage unit that stores firmware;

a first reception unit that receives an image processing job from a first sender;

a second reception unit that receives a firmware rewriting job from a second sender;

a job management table in which the received image processing job and the received firmware rewriting job are registered;

an image processing job execution unit that executes the image processing job with use of the firmware;

a firmware rewriting unit that rewrites the firmware by executing the received firmware rewriting job;

a modifying unit that, when one of the first reception unit and the second reception unit receives a job, modifies an order of jobs registered in the job management table;

an instruction unit for instructing the image processing job execution unit and the firmware rewriting unit to respectively execute the jobs in the order in which the jobs are registered in the job management table; and an urgency degree judgment unit that judges a degree of urgency of the firmware rewriting job;

an inquiry unit that, when the degree of urgency is lower than a predetermined degree, makes an inquiry to the first sender about an order of priority of the image processing job and the firmware rewriting job; and a response reception unit that receives a response to the inquiry, from the first sender, wherein the modifying unit, when the degree of urgency is equal to or higher than a predetermined degree, modifies the order in the job management table so that the firmware rewriting job is executed before the image processing job, and, when the degree of urgency is lower than the predetermined degree, modifies the order according to the response.

* * * * *